US005904725A

United States Patent [19]

Iisaka et al.

[11] Patent Number: 5,904,725

[45] Date of Patent: May 18, 1999

[54] LOCAL POSITIONING APPARATUS

[75] Inventors: Atsushi Iisaka, Takatsuki; Nobuhiko Yasui, Moriguchi; Mamoru Kaneko, Katano, all of Japan

[73] Assignee: Matsushita Electric Industrial Co., Ltd., Osaka-fu, Japan

[21] Appl. No.: 08/637,417

[22] Filed: Apr. 25, 1996

[30] Foreign Application Priority Data

Apr. 25, 1995 [JP] Japan .................................... 7-099180

[51] Int. Cl.[6] .................................................. G06F 165/00

[52] U.S. Cl. ........................... 701/207; 701/28; 348/116; 348/118

[58] Field of Search ............................ 701/28, 200, 207, 701/208, 213; 348/116, 118, 119, 148, 117; 382/104, 281

[56] References Cited

U.S. PATENT DOCUMENTS

| | | | |
|---|---|---|---|
| 4,970,653 | 11/1990 | Kenue | 348/116 |
| 5,220,508 | 6/1993 | Ninomiya et al. | 348/119 |
| 5,233,527 | 8/1993 | Shinnosuke | 701/28 |
| 5,245,422 | 9/1993 | Borcherts et al. | 348/119 |
| 5,301,115 | 4/1994 | Nouso | 348/118 |
| 5,341,437 | 8/1994 | Nakayama | 701/28 |
| 5,359,666 | 10/1994 | Nakayama et al. | 348/119 |
| 5,379,353 | 1/1995 | Hasegawa et al. | 382/41 |
| 5,517,412 | 5/1996 | Unoura | 348/118 |
| 5,621,645 | 4/1997 | Brady | 701/117 |

FOREIGN PATENT DOCUMENTS

| | | |
|---|---|---|
| 0 361 914 | 4/1990 | European Pat. Off. . |
| 0 363 339 | 4/1990 | European Pat. Off. . |
| 0 586 857 | 3/1994 | European Pat. Off. . |

*Primary Examiner*—Gary Chin

*Attorney, Agent, or Firm*—Wenderoth, Lind & Ponack, L.L.P.

[57] ABSTRACT

A local positioning device detects a local position of an automobile advancing along a lane formed on a road in a direction. A digital image data indicative of an advancing direction view observed from the automobile in the advancing direction is applied to the local position device. An edge extractor, a threshold generator, and a contour extractor are operable for extracting a contour data indicative of the lane from the image signal. A coordinate convertor converts the contour data into a plane view data indicating the dimensions of extracted contours correctly. A matching operator matches a line or an arc with each of extracted contour. A lane mark contour extractor selectively extracts a pair of extracted contours corresponding to the lane on which the automobile is located.

26 Claims, 23 Drawing Sheets

LP1
Si
1
EDGE EXTRACTOR
Sx
3
THRESHOLD GENERATOR
Eth
5
CONTOUR EXTRACTOR
Sc
7
COORDINATE CONVERTOR
Scc
9
MATCHING OPERATOR
Sm
11
LANE MARK CONTOUR EXTRACTOR
See,Smc
15
CURRENT POSITION DETECTOR
Sr
13
REGION LIMITER
19
YAW ANGLE DETECTOR
17
CURVATURE DETECTOR

START
S11
i=0 , COUNT_I=0
S13
WLi IS AVAILABLE ?
NO
YES
S21
i=I+1
S15
COUNT_I=COUNT_I+1
S17
CONVERT WLi INTO (ρ, θ) PLANE ρ=Xicos φ+Zisin φ
S19
ALL WLi ARE CONVERTED ?
NO
YES
S23
OBTAIN MAX_I (ρ MAX, φ MAX)
S25
MAX_I>(COUNT_Ixβ) ?
YES
NO
S27
MATCHING A LINE
S29
MATCHING AN ARCH
END START
S41
i=0
S49
i=i+1
S43
ARE i-TH AND (i+1)-TH CONTOUR PIXEL AVAILABLE ?
NO
YES
S45
SLi_i+1=(yi−yi+1) / (IL (yi)−IL (yi+1))
S47
i=(K−1) ?
NO
YES
S51
ρ'=Xcos φ'+SLi_i+1 · sin φ'
y'=2Dx+E
S53
D≦0 ?
NO
YES
S57
ρ"=ycos φ"+1/SLi_i+1 · sin φ"
x'=2Gy+H
S59
SUBSTIUTE (y,1/SLi_i+1) FOR THE EQUATION (13) TO DETERMINE "I"
S55
SUBSTIUTE (x,SLi_i+1) FOR THE EQUATION (11) TO DETERMINE "F"
END

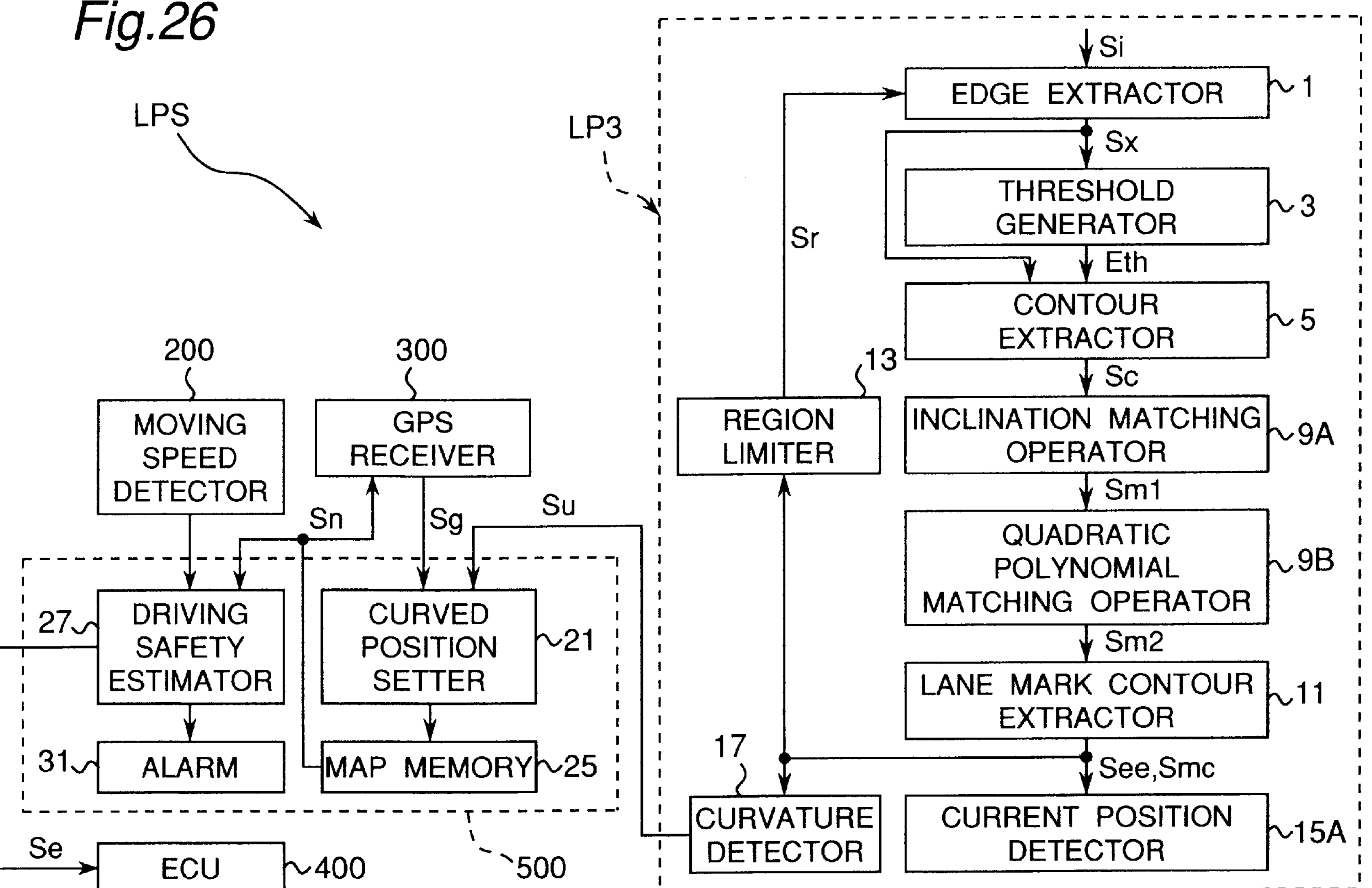
Fig.26
LPS
LP3
Si
EDGE EXTRACTOR
1
Sx
THRESHOLD GENERATOR
3
Eth
CONTOUR EXTRACTOR
5
Sc
INCLINATION MATCHING OPERATOR
9A
Sm1
QUADRATIC POLYNOMIAL MATCHING OPERATOR
9B
Sm2
LANE MARK CONTOUR EXTRACTOR
11
See,Smc
CURRENT POSITION DETECTOR
15A
13
Sr
REGION LIMITER
17
CURVATURE DETECTOR
Su
300
GPS RECEIVER
Sg
CURVED POSITION SETTER
21
MAP MEMORY
25
500
Sn
200
MOVING SPEED DETECTOR
DRIVING SAFETY ESTIMATOR
27
ALARM
31
400
ECU
Se LPS
LP4
Si
EDGE EXTRACTOR
1
Sx
THRESHOLD GENERATOR
3
Eth
CONTOUR EXTRACTOR
5
Sc
INCLINATION MATCHING OPERATOR
9A
Sm1
QUADRATIC POLYNOMIAL MATCHING OPERATOR
9B
Sm2
LANE MARK CONTOUR EXTRACTOR
11
See,Smc
CURRENT POSITION DETECTOR
15A
Sr
REGION LIMITER
13
CURVATURE DETECTOR
17
300
GPS RECEIVER
Si
Sn
Sg
Su
500R
IMAGE CAPTURE DEVICE
33
CURVED POSITION SETTER
21
DISPLAY
34
MAP MEMORY
25

LPP
Si
1P
EDGE EXTRACTOR
Sx'
3P
THRESHOLD GENERATOR
Eth'
5P
CONTOUR EXTRACTOR
Sc'
9P
MATCHING OPERATOR
Sm'
11P
LANE MARK CONTOUR EXTRACTOR
Smc'
Sr'
13P
REGION LIMITER
19P
YAW ANGLE DETECTOR
17P
CURVATURE DETECTOR
15P
CURRENT POSITION DETECTOR

LOCAL POSITIONING APPARATUS

BACKGROUND OF THE INVENTION

1. Field of the Invention

The present invention relates to a local positioning apparatus for use in a local positioning system for providing local positioning data related to location, velocity, and posture of an object on the local ground and particularly suitable for detection of both the moving and stationary states of an automobile on the road.

2. Description of the Prior Art

In FIG. 30, a conventional local positioning apparatus used in an automobile is shown. The conventional local positioning system LPP includes an edge extractor 1P, a threshold generator 3P, a contour extractor 5P, a matching operator 9P, and a lane mark contour extractor 11P, a region limiter 13P, a current position detector 15P, a curvature detector 17P, and a yaw angle detector 19P.

The edge extractor 1 is connected to a digital imaging device 100 mounted on an automobile AM (FIG. 1) for obtaining a perspective view Vi of the object located in an advancing direction of the automobile AM. The edge extractor 1 receives the image signal Si indicating the advancing direction view Vi (FIG. 3) of the road surface wherein lane markings Lm1, Lm2, and Lm3 are applied. The edge extractor 1 extracts edge pixels from the signal Si and produces an extracted edge pixel signal Sx' indicative of an extracted edge view Vx' including edge pixels of the lane makings Lm.

The threshold generator 3P determines a threshold Eth' to extract the edge pixels around the contour of the image of the lane makings from the edge pixel data signal Sx' according to a known method. The contour extractor 5 scans the signal Sx' with respect to the threshold Eth' to extract a line of each lane marking Lm, and produces an extracted lane marking signal Sc'.

The matching operator 9P determines the straight or curved line matching the extracted lane contour line data Sc, and produces a matching signal Sm' including dimensional data of such matching lines. The lane mark contour extractor 11P extracts only the matching lines satisfying the possible dimensional features of lane marks on the road from the signal Sm' to produce an extracted lane signal Smc'.

Based on the extracted lane signal Smc', the region limiter 13P determines a region around each of the thus extracted lane marking lines having a predetermined area. Then, the region limiter 13P produces a region signal Sr' defining the regions.

Based on the region signal Sr', the edge extractor 1 limits the area to scan around the detected lane markings. The current position detector 15P detects the position with respect to the road on which the automobile AM is currently located. The curvature detector 17P obtains the curvature of the lane. The yaw angle detector 19P detects the tilting angle of the automobile with respect to the lane.

However, according to the perspective view, since the three-dimensional relationships are represented on a two-dimensional surface, the distant object is represented by a smaller size than the near object. The object's shape is distorted more depending on the distance remote from the imaging device 100 or the automobile AM.

Since the three-dimensional relationships are represented on a two-dimensional surface in the perspective view, the distant object is represented by a smaller size than the near object. In other words, an object in a position far from the automobile AM is expressed in a distorted shape more than that in a position nearby. Note that the images obtained by the signals Si, Sx', and Sc' operate to express the actual (true) shape of the object as a plan view for example.

It is impossible to obtain correct dimensional information of the object from the signal Sc' regardless the distance between the object and the imaging device 100. This clearly means that correct dimensional information of the road (lane) cannot be obtained, and much less the positional relationships between the automobile and the road.

Note that all positioning operation such as matching, lane contour extraction, current position detection, curvature detection, and yaw angle detection are performed based on such incorrect dimensional information included in the signal Sc. Apparently, positioning operation by the conventional local positioning apparatus LPP is incorrect, unreliable, and hazardous.

Another conventional local positioning apparatus is proposed in Japanese Laid-Open Patent Publication H3-139706. According to this conventional local positioning apparatus, an image of two lane marks for guiding an automobile is taken by an imaging device. Two tangent lines having different lengths are drawn to those two lane marks for calculating a curvature of the lane marks. Based on this calculated curvature and a relationship between a curvature and automobile conditions which are previously stored therein, the shifting distance in a lateral direction is obtained.

However, sometimes the lane has a curvature too small to detect correctly. Furthermore, when an interval between two lane markings varies, the conventional local positioning apparatus cannot function properly. As a result, a local position of the automobile on a road cannot be detected.

SUMMARY OF THE INVENTION

The object of the present invention is therefore to provide an improved local positioning apparatus which solves these problems.

In order to achieve the aforementioned objective, a local positioning apparatus for detecting a local position of an object is provided. The object is one which can advance in a direction with respect to a lane on a local ground area. The position is calculated based on a digital image signal representing a perspective view of the local ground area. The apparatus comprises a contour extraction means for extracting a contour of the lane from the digital image signal to produce contour data, a conversion means for converting the contour data into a plane view system to indicate the dimensions of the extracted contour correctly to produce coordinate converted data, and a feature detection means for detecting dimensional features of the extracted contour line based on the coordinate converted data to produce dimensional data.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 26 is a block diagram showing an alternative of the local positioning apparatus of FIG. 19.

DETAILED DESCRIPTION OF THE PREFERRED EMBODIMENTS

First Embodiment

Figure 1:
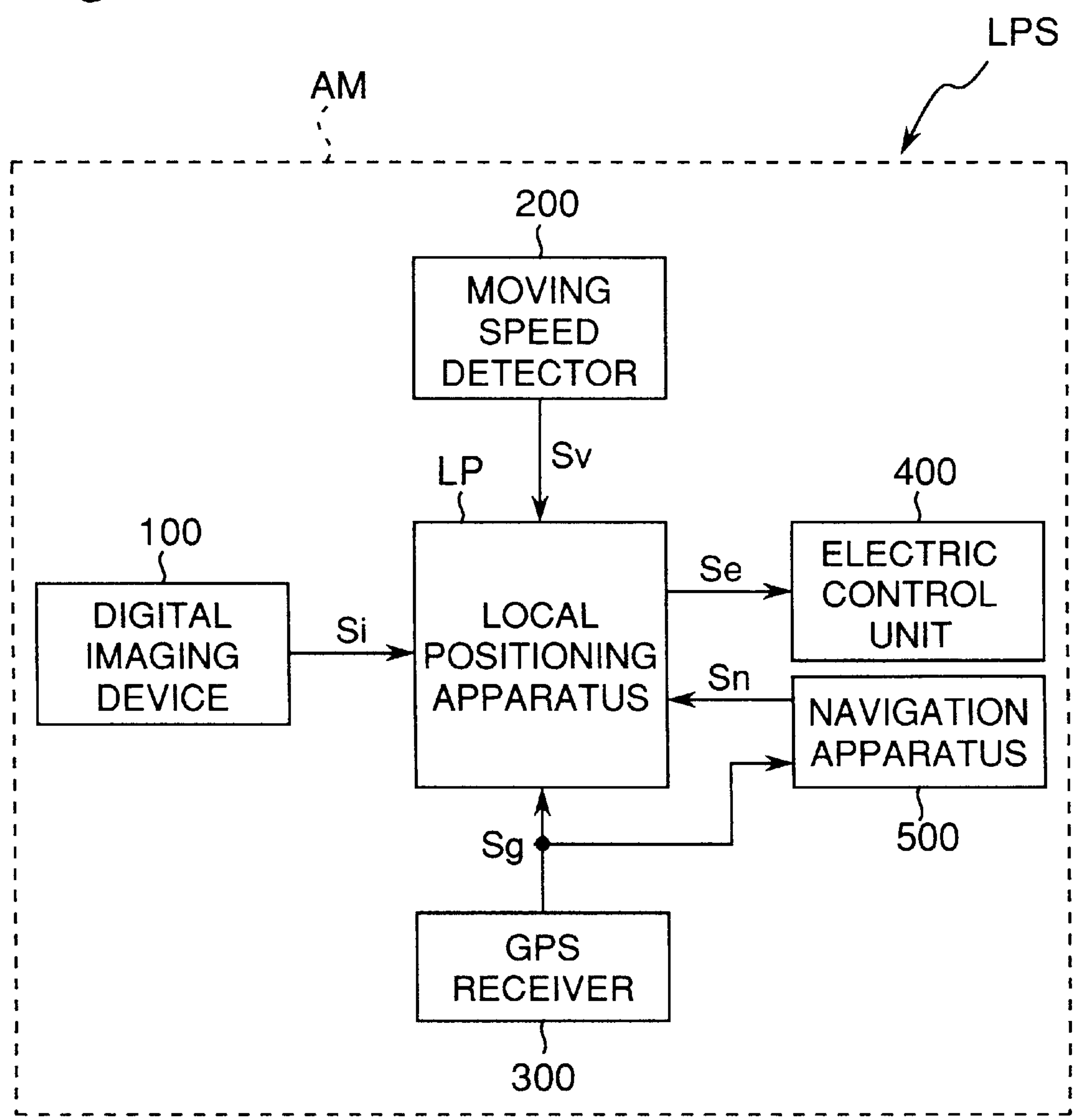
FIG. 1 is a block diagram showing a local positioning apparatus, according to a preferred embodiment of the present invention, incorporated in a local positioning system installed in an automobile.

Referring to FIG. 1, a local positioning apparatus according to a preferred embodiment of the present invention incorporated in a local positioning system LPS is shown. In this embodiment, the local position system LPS is installed in, for example, an automobile AM. The local positioning system LPS includes a local positioning apparatus LP, a digital imaging device 100, a moving speed detector 200, a global positioning apparatus (GPA) 300, an electric control unit (ECU) 400, and a navigation system 500.

Figure 3:
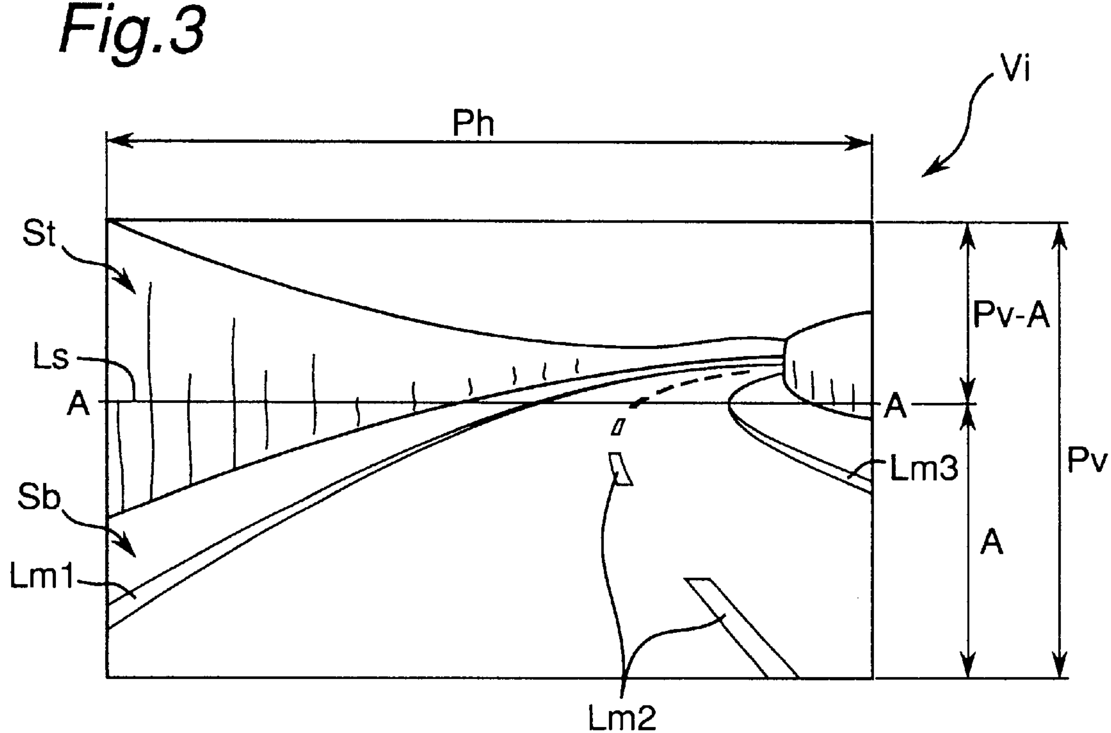
FIG. 3 is a graph schematically showing an advancing direction view Vi obtained by the digital imaging device of FIG. 1.

The digital imaging device 100 is preferably constructed by any suitable imaging device that can successively obtain digital image data of an object represented by a Ph×Pv pixel area (FIG. 3). "Ph" and "Pv" represent the numbers of pixels arranged in the horizontal direction and the vertical direction, respectively, of the image matrix, and directly determine the resolving power of the image data. The greater the values of Ph and Pv the higher the resolving power, or operation accuracy provided, thereby resulting in an increased manufacturing cost. Therefore, these numbers Ph and Pv should be determined in accordance with the required resolving power and the cost, and are determined as 428 and 268 in this example.

The digital imaging device 100 is preferably provided near the front end of the automobile AM for successively obtaining an image (still or moving pictures) of an advancing direction view, which is a perspective view from over from the automobile AM, to produce an image signal Si in a form of digital data indicative of the thus obtained image.

Figure 7A:
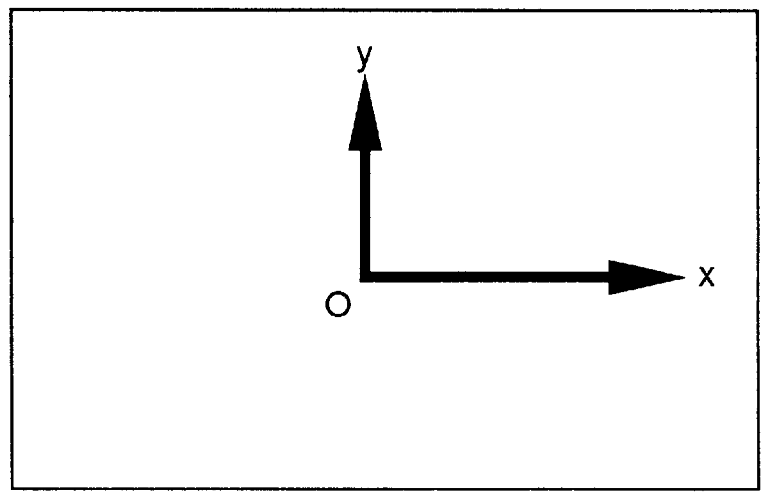
Figure 7B:
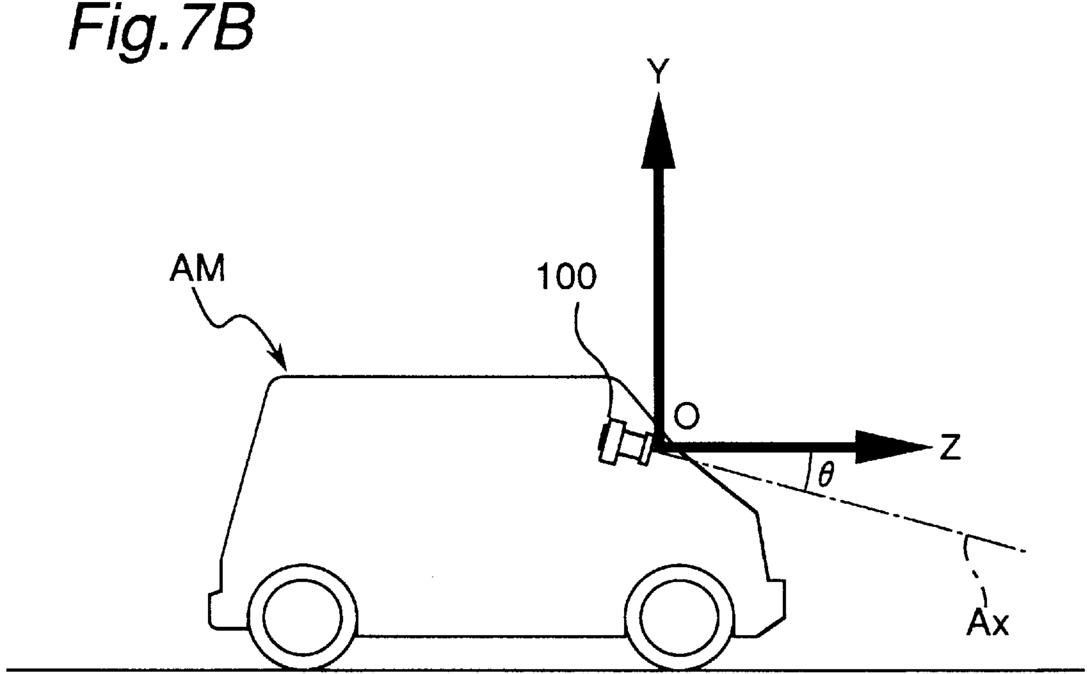

Referring to FIG. 7B, a side view of automobile AM having the digital imaging device 100 on the front end portion thereof is shown schematically. The digital imaging device 100 is mounted in a manner tilting downward such that an optical axis Ax thereof crosses the horizontal plane (corresponding to the road surface on which the automobile moves) with a predetermined angle θ. Note that the optical axis Ax is in alignment with the advancing direction Z of the automobile AM. As a result, the perspective view in front of (viewed from) the automobile AM (imaging device 100) can be obtained. The imaging device 100 having an imaging angle wide enough to obtain the image of the position just under the front end of the automobile AM.

Referring to FIG. 3, an image obtained by the digital imaging device 100 is shown. This image shows an advancing direction view Vi, viewed from the automobile AM, in the direction in which the automobile AM is moving. In this example, the automobile AM is driving on a left side lane LL defined by two white painted lane markings Lm1 and Lm2 on the road having two driving lanes. A right side lane is defined by two white painted lane markings Lm2 and Lm3. The bottom line of the view Vi shows the view just under the front end of the automobile AM.

Referring back to FIG. 1, the moving speed detector 200 is provided for detecting the moving velocity of the automobile AM, or the imaging device 100, to produce a vehicle speed signal Sv. A speedometer, for example, widely adopted in the automobile can be used for this purpose.

The GPA 300 is provided for receiving global positioning signals from navigational satellites to detect global positioning data related to location, velocity, and posture of an object on the earth to produce a global positioning signal Sg. For this purpose, a usual apparatus for so called Global positioning system is used.

The local positioning apparatus LP is connected to the digital imaging device 100, the moving speed detector 200, and the GPA 300 for receiving the image signals Si, the vehicle speed signal Sv, and the global positioning signal Sg, respectively, therefrom. Based on these signals, the local positioning apparatus LP performs various calculations to detect the moving and stationary state of the automobile AM, and produces various signals as described later. The construction and operations of the local positioning apparatus LP will be described in detail with reference to FIGS. 2, 19, 26, and 28 later.

The ECU 400 is connected to the local positioning apparatus LP for receiving the ECU control signal Se therefrom. Based on this signal Se, the ECU controls the operation of the engine of the automobile AM. Since the ECU is well known to the personnel skilled in the automobile industries, the further explanation is omitted for the sake of brevity.

The navigation apparatus 500 is connected to the local positioning apparatus LP for receiving the navigational signal Sn therefrom. Based on this signal Sn, the navigation system 9 performs various calculations to obtain the navigation data. For this purpose, a navigation apparatus commonly used for the automobile can be used.

Figure 2:
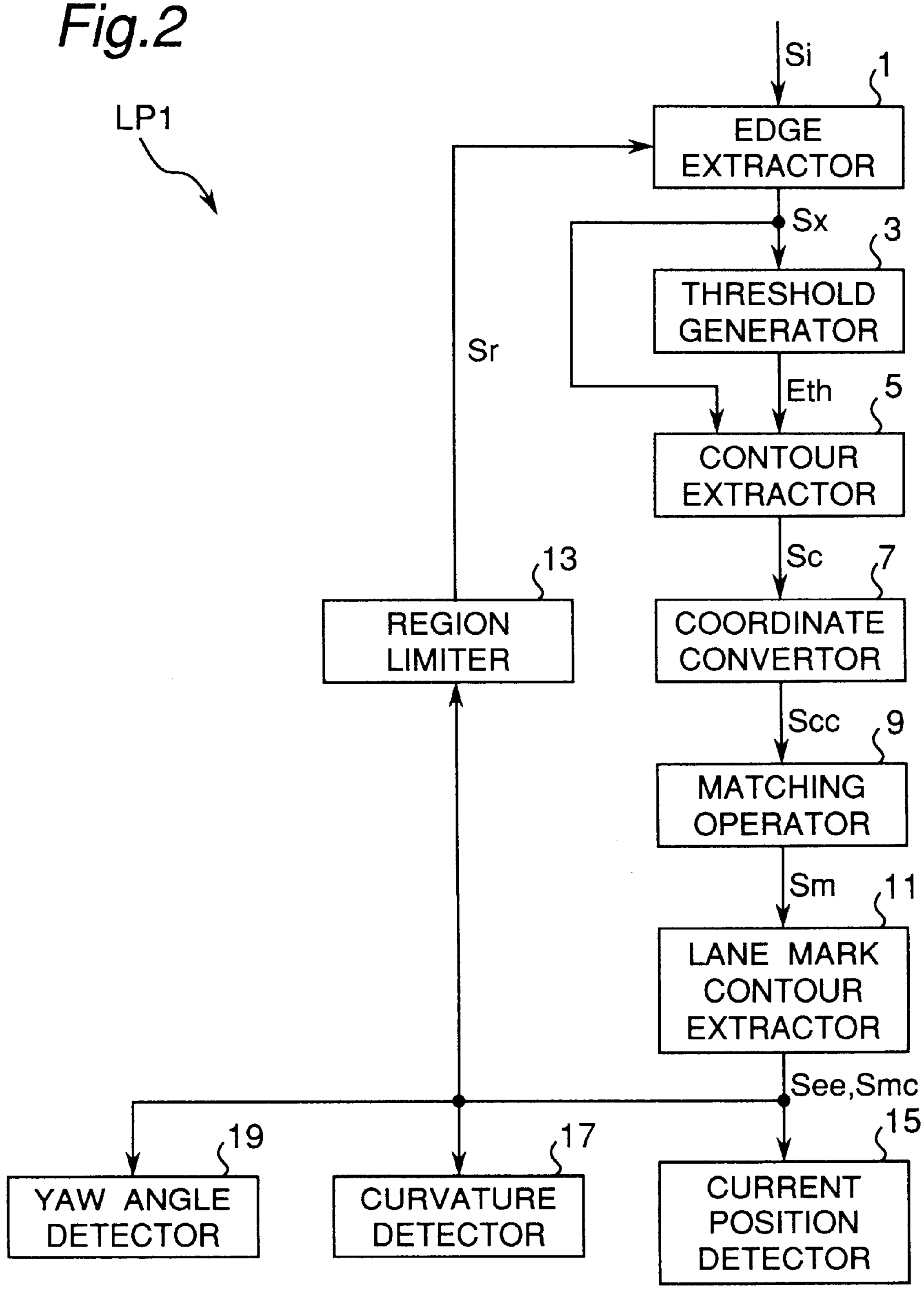
FIG. 2 is a block diagram showing the local positioning apparatus of FIG. 1 according to a preferred embodiment.

Referring to FIG. 2, an embodiment of the local positioning apparatus of FIG. 1 is shown. The local positioning apparatus LP1 includes an edge extractor 1, a threshold generator 3, a contour extractor 5, a coordinate converter 7, a matching operator 9, a lane mark contour extractor 11, a region limiter 13, a current position detector 15, a curvature detector 17, and a yaw angle detector 19.

The edge extractor 1 is connected to the digital imaging device 100 for receiving the image signal Si indicating the advancing direction view Vi therefrom to extract edge pixels at which the image density steeply changes, i.e., where an image density waveform has a steep slope. The edge extractor 1 applies a filtering process such as Sobel filtering, not to the entire area, but to a predetermined area of the advancing direction view Vi so as to extract edge pixels for reducing the operation load to secured high speed filtering operation as follows.

Referring to FIG. 3, the advancing direction view Vi subject to the filtering operation by the edge extractor 1 is shown. The view Vi is separated by a horizontal line Ls into two sections, top section St and bottom section Sb. This horizontal line Ls corresponds to a horizontal scanning line connecting pixels located on the A-th vertical position counted from the bottom line of the image Vi.

This A-th vertical position is preferably determined to correspond to the vertical position on which a vanishing point appears in the image Vi when the automobile AM is driving a flat road. In this example, the "A" is set to designate the pixels corresponding to the position about 50 m distant from the automobile AM, and has a value of 162. The advancing direction view Vi having Ph×Pv pixels area, directly viewed by the imaging device 100, is divided into section St defined by Ph×(Pv−A) pixels and section Sb defined by Ph×A pixels.

Just after starting the local positioning operation, the edge extraction (filtering) process is applied only to the bottom section Sb to extract edge pixels at which the image density changes steeply. Thus, the edge extractor 1 produces an extracted edge pixel signal Sx indicative of an extracted edge view Vx including edge pixels extracted from the section Sb (Ph×A pixels).

Figure 4:
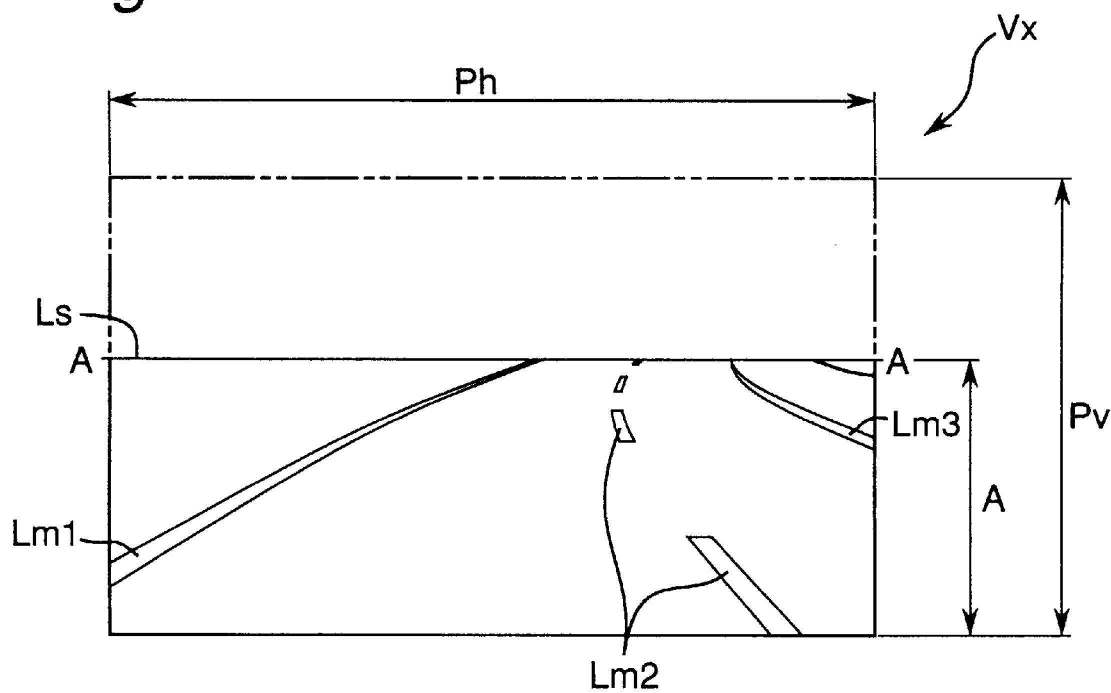
FIG. 4 is a graph schematically showing an edge pixel extracted view Vx indicating the edge pixels extracted from the view Vi of FIG. 3.

Referring to FIG. 4, the extracted edge view Vx is shown. In this example, from the bottom portion Sb of the image Vi, the lane markings Lm1, Lm2, and Lm3 are extracted. Note that the extracted edge pixels include the pixels mainly located around the contour of lane markings Lm1 and Lm2 together with the pixels (not shown in FIG. 4) on the other area of the section Sb.

Referring back to FIG. 2, the threshold generator 3 is connected to the edge extractor 1 for receiving the edge pixel signal Sx therefrom. The threshold generator 3 determines a threshold Eth to extract the edge pixels around the contour of the images of the lane markings from the edge pixel data signal Sx based on the density of edge pixels. The threshold Eth can be expressed by the following equation.

$$Eth=C\cdot E\max+(1-C)\cdot E\text{mean} \quad (1),$$

wherein "Emax" and "Emean" represent a maximum density and an average density, respectively, of edge pixels on a predetermined horizontal scanning line within the bottom section Sb, and "C" is a constant greater than 0 and smaller than 1.

Referring back to FIG. 2, the contour extractor 5 is connected to the edge pixel extractor 1 and the threshold generator 3 for receiving the edge pixel data signal Sx and the threshold Eth, respectively, therefrom. Based on these signals Sx and Eth, the contour extractor 5 scans within the bottom section Sb to extract a line of each lane marking image as follows.

Figure 5:
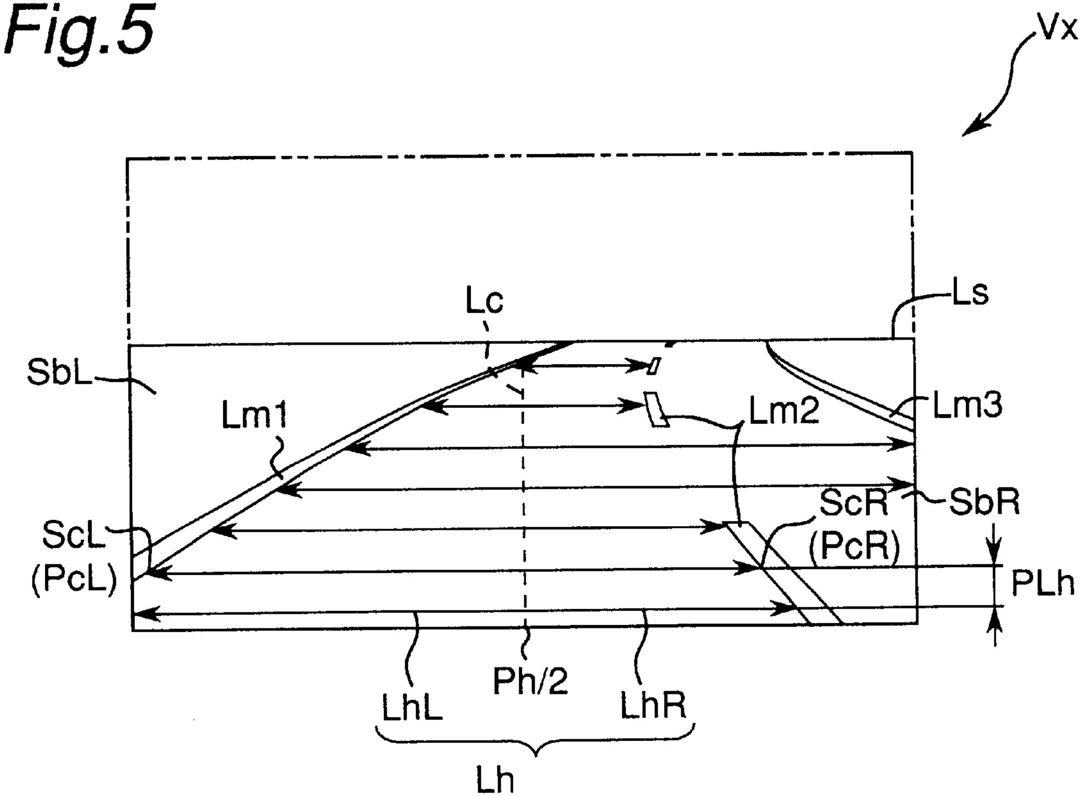
FIG. 5 is a graph, similar to FIG. 4, for explaining an edge pixel extraction operation by an edge extractor of FIG. 2.

Referring to FIG. 5, the edge pixel extracted view Vx subject to the extracting operation by the contour extractor 5 is shown. The bottom section Sb of the view Vx is further separated by a vertical center line Lc into two sub sections SbL and SbR, as shown. The vertical center line Lc preferably extends vertically from a pixel located on the center Ph/2 of bottom line of the image Vx, but is not limited to the center position Ph/2.

The extractor 5 compares the density of extracted edge pixel (Sx) on the horizontal scanning lines Lh with the threshold Eth in a centrifugal direction pixel by pixel, i.e., in a direction moving away from the vertical center line Lc toward the right and left sides, and from the horizontal line Ls (vanishing point) toward the bottom scanning line (automobile) pixel by pixel. Thus, a left contour extraction scanning line LhL extending within the left bottom section SbL toward the left side edge of the view Vx is obtained. Similarly, a right contour extraction LhR scanning line extending within the right bottom section SbR toward the right side edge of the view Vx is obtained.

This contour extracting operation can be applied along with the horizontal scanning lines Lh selected at a predetermined interval PLh to reduce the operation load and secure a high speed extraction operation. It is needless to say that PLh can be set to "zero," meaning that all horizontal scanning lines Lh are selected. The number K of scanning lines Lh can be expressed as $|Pv/PLh|$.

The contour extractor 5 stores the first edge pixel Pe having a density greater than the threshold Eth as the contour pixel with respect to each of contour scanning lines LhR and LhL as a left side pixel PcL and a right side pixel PcR. However, when the object is not continued such that the right lane marking Lm2 is a separated center lane marking as shown in FIG. 5, the right side counter scanning lines LhR can reach the right side lane marking Lm3 over the right lane marking Lm2 passing through gaps between the separated portions thereof.

As a result, the contour line ScR' corresponding to the inner contour of the right marking of the right lane is extracted. Since the first edge pixel Pe is detected with respect to each of the contour scanning lines LhR and LhL, any contour data other than the contour of the target lane are also obtained. After examining with respect to all contour scanning lines LhR and LhL, the extractor 5 produces a contour pixel data signal Sc indicative of a contour extracted view Vc.

Figure 6:
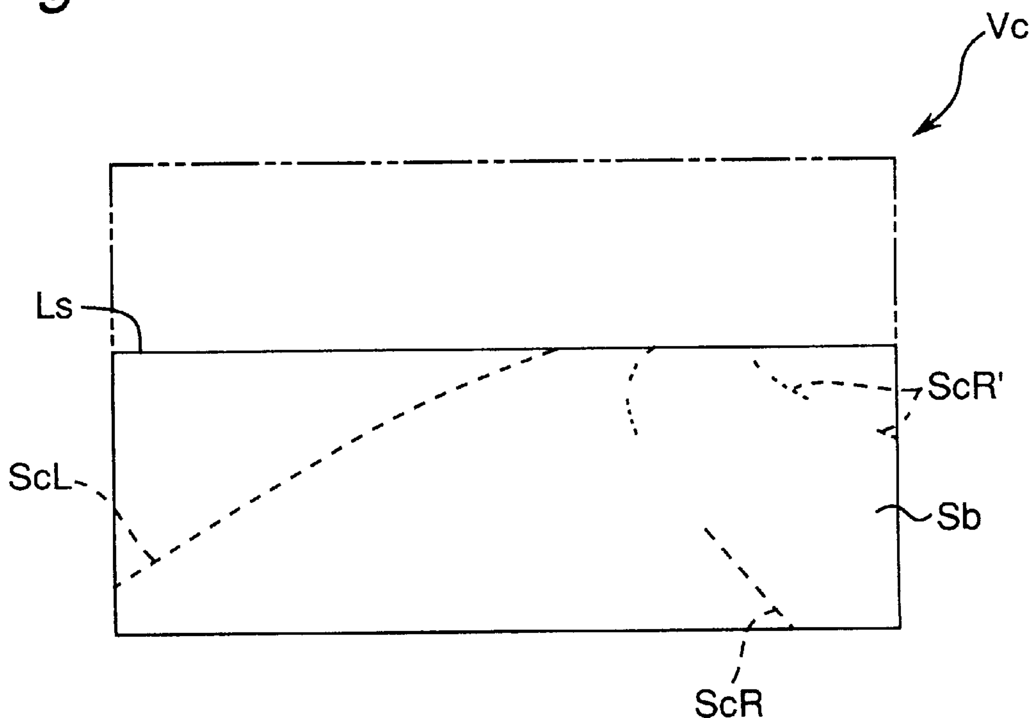
FIG. 6 is a graph schematically showing a contour extracted view Vc indicating the contour pixels extracted from the view Vx of FIG. 4, FIGS. 7A and 7B are graphs for explaining a coordinate conversion process according to the present invention.

Referring to FIG. 6, the obtained contour extracted view Vc is shown. As shown by dashed lines, only the inner side edges (ScL, ScR, and ScR') of contour lines of each lane markings Lm1, Lm2, and Lm3 are extracted. Note the contour edge ScR' of the right-side lane LR which is noise data for detecting the current driving lane is shown in the upper right corner of inner side edge ScR.

The coordinate convertor 7 is connected to the contour extractor 5 for receiving the contour pixel data signal Sc therefrom. The coordinate convertor 7 converts the coordinate system of the contour extracted view Vc to obtain a bird's-eye view Vb of the extracted contour line. Before describing the coordinate conversion by the convertor 7, the difference between the contour extracted view Vc and the bird's-eye view is described briefly.

The contour view Vc is extracted from the perspective views Vi and Vx. Since the three-dimensional relationships are represented on a two-dimensional surface, a distant object is represented by a smaller size than a near object. In other words, an object's shape is distorted more depending on the distance of the object from the imaging device 100 or the automobile AM.

With reference to FIGS. 7A and 7B, the concept of coordinate conversion by the coordinate convertor 7 is described herebelow. In FIG. 7A, the coordinate system for the extracted contour view Vc is shown. The y-axis is vertical, the x-axis is horizontal, and point 0 is the origin.

In FIG. 7B, the coordinate system for the imaging device 100 mounted on the automobile Am is shown. The Z-axis is horizontal and in alignment with the advancing direction of the automobile AM. The X-axis is horizontal and perpendicular to the Z-axis. Note that the X-axis extends perpendicularly to FIG. 7B, but is not shown for the sake of brevity.

Thus X-axis and Z-axis define a horizontal plane Pd substantially parallel to the surface of road or ground on which the automobile moves. The Y-axis vertical and in alignment with the y-axis. The origin point 0 coincides with the origin point of the view Vc, and is located on the optical axis of the imaging device 100. The coordinate for the contour view Vc can be converted into the coordinate for bird's-eye view Vb by using the following equations.

$$X=(x/F)\ (Z \cos \theta - Y \sin \theta) \quad (2).$$

$$Z=Y(F \cos \theta + Y \sin \theta) \quad (3).$$

$$Y=-H \quad (4).$$

"F" represents a focal distance of an optical lens used in the imaging device 100. "θ" represents a tilting angle of the optical axis of the imaging device 100 with respect to the horizontal plane defined by the X- and Z-axes. "H" is a distance from the ground surface to the origin of the optical system of the imaging device 100.

Both "θ" and "H" are preferably determined so that the advancing direction view Vi described with reference to FIG. 3 can be obtained by the imaging device 100. For example, "θ" and "H" set to 6° and 1.2 m, respectively.

By converting the distance in the view Vc in accordance with the above described equations (2), (3), and (4), a coordinate converted image signal Scc is obtained which indicates a coordinate converted view Vcc wherein the object shapes are represented in a plan view wherein the distance in the horizontal direction is correctly represented regardless of the distance in the Z-axis direction from the-imaging device 100.

In a strict sense, the obtained view Vcc is not a bird's-eye view, and is a plane view of the lane (road) projected on a plane parallel to the road. Therefore, the view Vcc always shows a flat surface even if the road (lane) is raised like a small hill. However, it is to be noted that such difference will not spoil the local positioning operation substantially, because the local positioning operation is performed with respect to a relatively near position such as 50 m from the automobile, as described before. In such a nearby area, undulations of the road surface can be neglected.

However, a bird's-eye view in a strict sense can be obtained by mounting the imaging device 100 on the automobile AM in a constant altitude such that the optical axis Ax is kept parallel to the horizontal by utilizing a known altitude control device such as a gyroscope.

Figure 8:
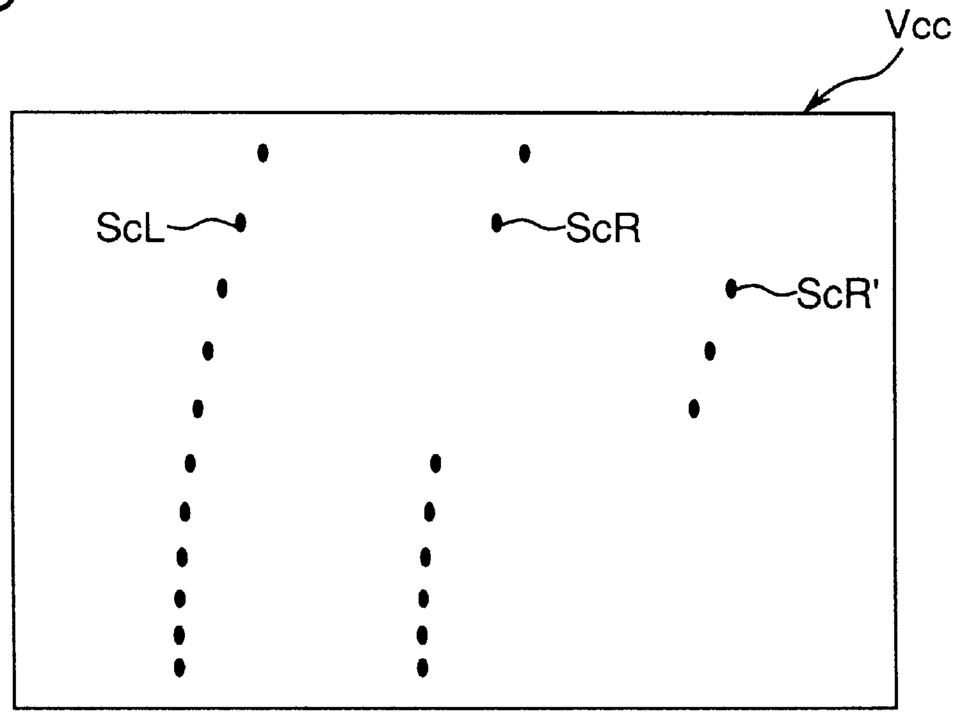
FIG. 8 is a graph showing a coordinate converted view Vcc indicating the contour pixels in the view Vc of FIG. 6 in a plane view.

Referring to FIG. 8, the coordinate converted view Vcc is shown. Note that the lane markings Lm1, Lm2, and Lm3 are represented by the inner edge contour lines ScL, ScR, and ScR', respectively, as parallel lines. Furthermore, note that the signal Scc includes information of correct dimensions of the object, or the lanes LL and LR. Note that the image Vcc of FIG. 8 corresponds to the bottom section Sb of image Vc of FIG. 4.

Referring back to FIG. 2, the matching operator 9 is connected to the coordinate converter 7 for receiving the coordinate converted image signal Scc therefrom. On receipt of the coordinate converted image signal Scc, the matching operator 9 performs a matching operation as follows.

The Hough transformation process is applied to each of the coordinate converted data of the inner edge contour lines ScL, ScR, and ScR' in the data Scc separately based on the following equation.

$$\rho = X \cos \phi + Z \sin \phi \quad (5),$$

wherein "ρ" is a distance between the origin 0 and a pixel of the contour data in the Z-X coordinate; and "ϕ" is an angle between the X-axis and the line extending between the original 0 and the pixel.

From the equation (5), the following equation corresponding to a line can be obtained.

$$X=(\rho - Z \sin \phi)/ \cos \phi \quad (6).$$

As a result of Hough transformation of the contour line data in the coordinate converted contour data Scc, a group of curves is obtained in a parameter space with respect to each of the extracted contour line data ScR and ScL.

Figure 9:
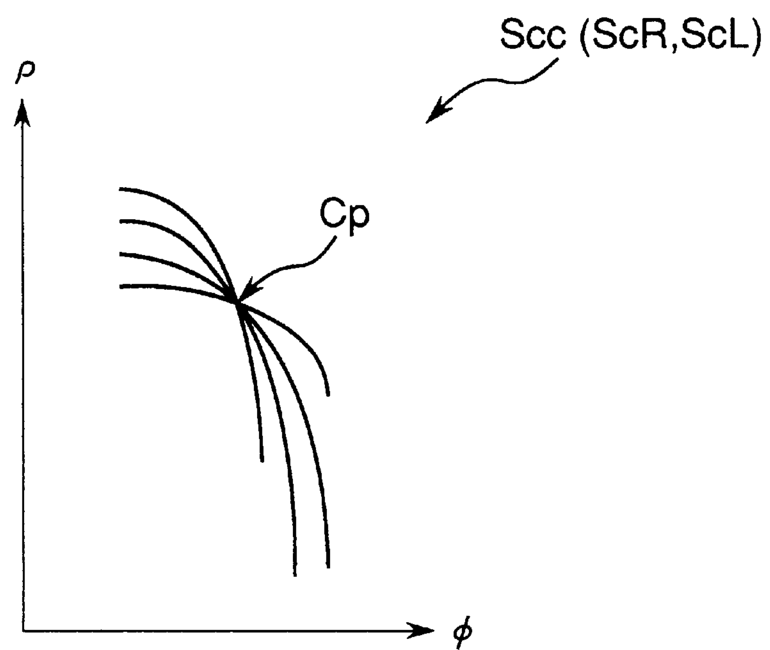
FIG. 9 is a graph showing typical patterns of curves of a linear contour line data obtained by the Hough transformation.
Figure 10A:
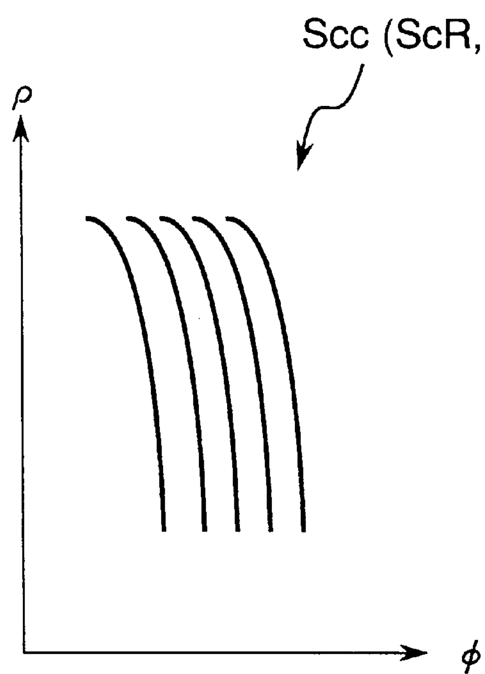
FIGS. 10A and 10B are graphs similar to FIG. 9, but showing typical patterns of curves of a nonlinear contour line data obtained by Hough transformation.
Figure 10B:
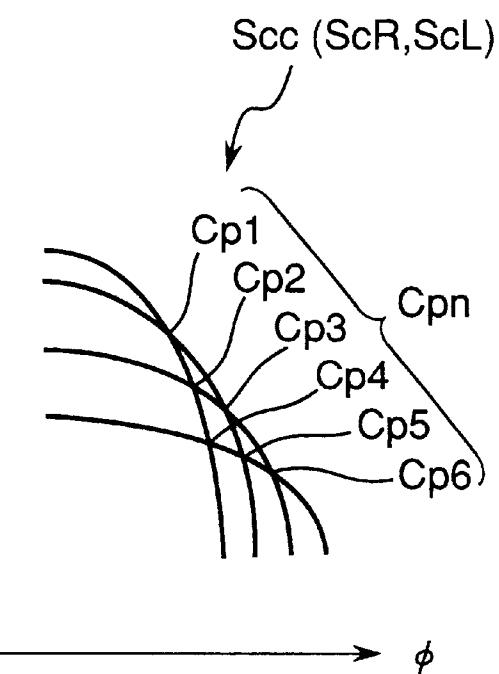

Referring to FIGS. 9, 10A, and 10B, typical patterns of curves of the Hough transformed coordinate converted contour line data Scc (ScR and ScL) in the parameter space are shown. As best shown in FIG. 9, the curves of the Hough transformed contour data cross each other at a single crossing point Cp in the parameter space when the contour line is linearly arranged on a straight line. However, when the contour line is not arranged on a straight line but a curved line, the curves never cross each other as shown in FIG. 10A or cross at plural points Cp1, Cp2, Cp3, Cp4, Cp5, and Cp6 (generalized as Cpn, "n" is an integer), as shown in FIG. 10B.

Note that it is substantially impossible to draw the lane markings Lm having completely straight side lines on the road. Therefore, the contour lines ScR and ScL extracted from the image of lane markings Lm essentially include a non-straight portion therein. In this view point, the curves are likely to cross at plural points Cpn.

However, the principles described with reference to FIGS. 9, 10A, and 10B are apparently effective with respect to the general portion of the contour lines ScR (ScR') and ScL. In other words, almost all the Hough transformed curves extracted from the straight lane cross at the same point. In consideration of these facts, the matching operator 9 detects a crossing frequency Fc of each crossing point Cpn at which curves cross each other to compare with a predetermined threshold Fth.

Then, the matching operator 9 determines one crossing point Cpn where the crossing frequency Fc, is greater than the threshold Fc as the single crossing point Cp. In this case, it is judged that the contour line ScR or ScL is a straight line, meaning that the automobile AM is currently driving or stationed on a straight lane (road). Thus, a straight line ScRm or ScLm matching the inner side line of the line marking Lm (Lm1 and Lm2) can be obtained in the parameter space. Then, a line expressed by the equation (6) can be matched.

When there is no crossing point Cpn where the crossing frequency Fc is greater than the threshold Fth, the matching operator 9 determines that all curves do not cross at a single crossing point. In this case, it is judged that the contour line ScR, ScR', or ScL is a curved line, meaning that the automobile is currently driving or stationed on a curved lane (road). The matching operator 9 further obtains the curved line corresponding to that of the inner side line of the line marking Lm by representing an arc, as described below.

Figure 11:
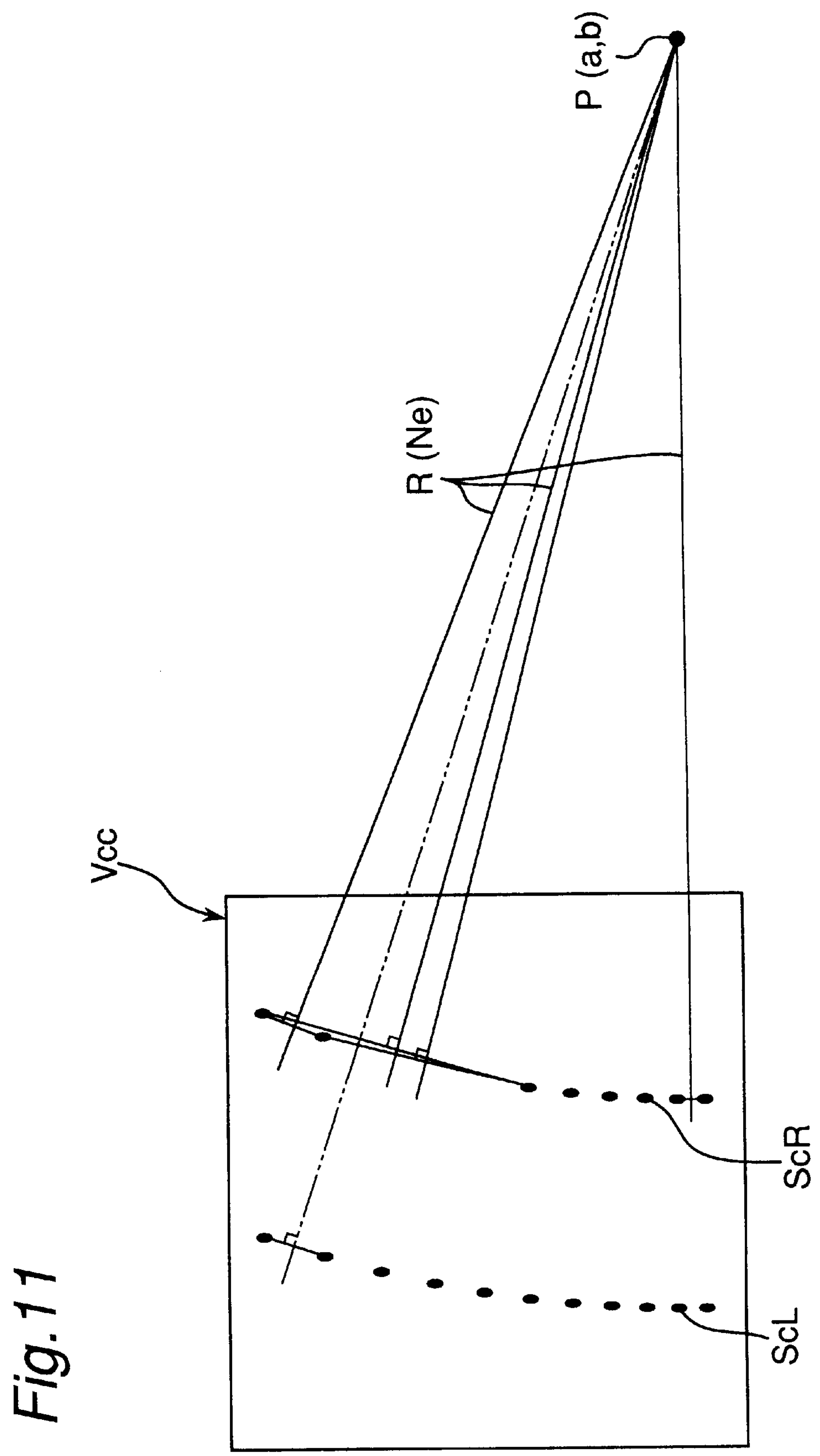
FIG. 11 is a graph for explaining an arc matching operation by the matching operator of FIG. 2.

Referring to FIG. 11, a matching operation for obtaining an arc representing the curved lane is shown schematically. In the left portion of FIG. 11, the image view Vcc of FIG. 8 is shown in a reduced scale. The matching arc is obtained with respect to each of contour lines ScR, ScR' or ScL. For example, the arc ScRm matching the contour line ScR is obtained as follows.

Every edge pixel on the contour line ScR is paired with other edge pixels thereon, and each of these pairs of pixels are connected by a line corresponding to a chord of an arc joining these paired pixels. Therefore, when the number Ne ("Ne" is an integer) of edge pixels Pe are on the contour line ScR, there will be (Ne−1)! of lines obtained. "(Ne−1)!" represents the factorial of (Ne−1).

Next, a perpendicular at midpoint with respect to each of (Ne−1)! of chords is obtained. Thus, (Ne−1)! of lines $R_{(Ne)}$ corresponding to the radius of a circle having those edge pixels Pe are obtained. A point P at which most of lines $R_{(Ne)}$ cross is determined as a center of this arc. This center point P is expressed as (a, b) in the X-Z coordinate system. Since the center point P is determined based on all chords extending between all edge pixels on the contour line ScR, the center P can be determined with high precision. Based on the center point P and radius length obtained with high precision, a function representing the arc ScRm matching the contour line ScR is obtained as expressed by the following equation.

$$(X-a)^2+(Z-b)^2=R^2 \quad (7).$$

This matching arc line ScRm can be obtained by utilizing other methods than the above described method such as the least squares method and the Hough transformation. Furthermore, it is also possible to determine the center P based on (Ne−1) of chords made by neighboring pixel pairs.

Similarly, the matching operator 9 further obtains the straight line or arc ScLm and ScR'm matching the other contour lines ScL and ScR', respectively. Thus, the dimensional data indicating the shape, length, and arranging pattern of each lane contour line is obtained. Then, the matching operator 9 produces a matching signal Sm including such dimensional information data of matching straight line or arcs ScRm, ScR'm, and ScLm.

Referring back to FIG. 2, the lane mark contour extractor 11 is connected to the matching operator 9 for receiving the matching signal Sm therefrom. The lane mark contour extractor 11 includes the dimensional feature data indicating the lane markings Lm for possible lanes such as a length, a width, an interval of each separated portions, and arranging pattern thereof, the width of the automobile AM, and so on. Note that these dimensional feature data are effective regardless of the number of lanes. The lane mark contour extractor 11 compares the dimensional features of the contour lines ScR, ScR', and ScL which are matched the straight line or curved line with the dimensional feature data stored therein.

The operation of the lane mark contour extractor 11 will described below with reference to FIG. 8, because the view Vcc of FIG. 8 is substantially the same as the view Vm indicated by the matching signal Sm. However, the matching contour lines ScLm, ScRm, and ScR'm that are continual lines are represented by the contour line data ScL, ScR, and ScR', respectively.

Until the second pixels, counting from the top toward the bottom of the view Vcc, the contour lines ScL (ScLm) and ScR (ScRm) are paired. The lane mark contour extractor 11 compares the distance between both lines ScL (ScLm) and ScR (ScRm) with an allowable range of a lane width in the dimensional feature data stored therein, and determines that both contour lines ScL (ScLm) and ScR (ScRm) are a true pair of contour lines defining a single lane.

From the third to fifth pixels, the contour lines ScL (ScLm) and ScR' (ScR'm) are paired. The contour lines ScL (ScLm) and ScR' (ScR'm) correspond to the lane markings Lm1 and Lm3 defining two lanes LL and LR, as described with reference to FIG. 3. Therefore, the lane mark contour extractor 11 determines that the lines ScL (ScLm) and ScR' (ScR'm) are not a true pair for a lane. However, it is to be noted that the contour line ScL (ScLm) is one of true pairs of contour lines defining a single lane.

From the sixth to eleventh pixels, the counter lines ScL (ScLm) and ScR (ScRm) are determined as a true pair of lane markings in the same manner as for the first to second pixels. Furthermore, since the contour line ScL is matched with a single arc ScLm by the matching operator, it is judged as three (from the third to fifth) pixels are determined as the contour line of left side lane marking Lm1. However, the three pixels of contour line ScR' (ScR'm) are neglected. Thus, only a true pair of contour lines ScL (ScLm) and ScR (ScRm) are extracted from the matching signal Sm. Similarly, the contour lines ScRm and ScR'm are extracted from the signal Sm when the automobile AM, and the imaging device 100, moves to the right-sided lane LR.

As is apparent from the above, the lane mark contour extractor 11 can extract the true pair of counter lines of the lane on which the automobile AM (imaging device 100) currently moves or is located regardless of the number of lanes. Then, the lane contour extractor produces an extracted lane contour signal Smc indicative of the extracted lane contour view Vmc.

However, when there is no contour line that satisfies the dimensional feature data stored therein, the lane mark contour extractor 11 produces an error signal See. This means that the local positioning operation faces such difficulties that no lane marking Lm is applied on the road, or only one lane marking is applied over the viewing scope of the imaging device 100. In other words, no information useful for guiding the automobile AM along a road is detected. Note that the error signal See can include the information included in the signal Smc.

Figure 12:
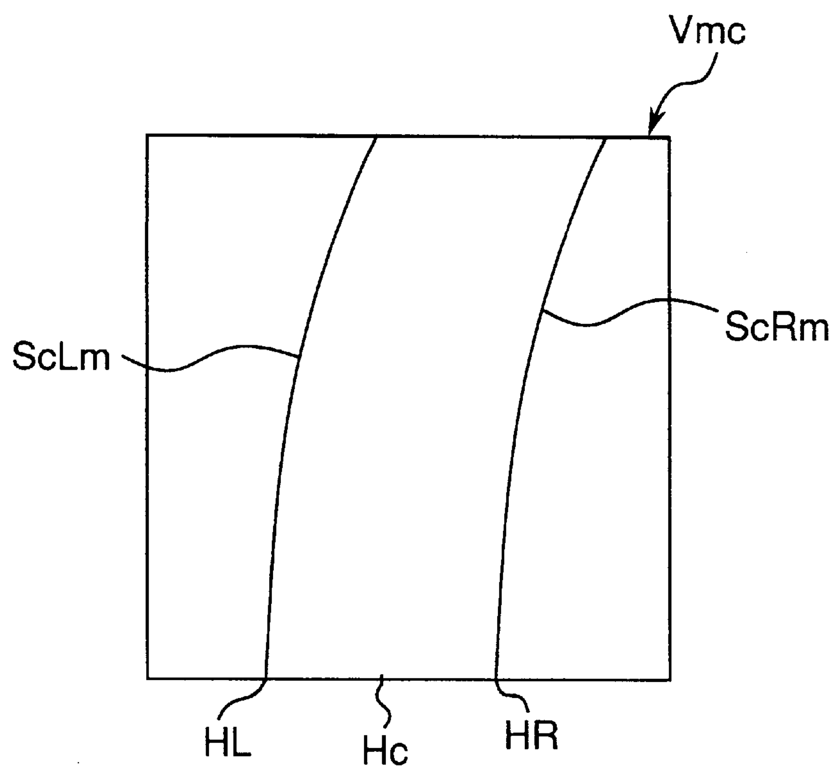
FIG. 12 is a graph for explaining a region determining operation based on the matched lines obtained by the matching operator of FIG. 2.

Referring to FIG. 12, the lane mark contour extracted view Vcm is shown. The extracted pair of lane mark contour lines ScLm and ScRm matched by the arcs ScLm and ScRm are shown. The noise data such as the contour line ScR'm (ScR') of the neighboring lane LR in the view Vc are not included in the view Vcm. Thus, contour line data other than that of the lane on which the automobile AM (or the imaging device 100) is advancing can be removed from the image data Vcc (Vm) in FIG. 8.

Referring back to FIG. 2, the region limiter 13 is connected to the lane mark contour extractor 11 for receiving the extracted lane contour signal Smc or the error signal See therefrom. The region limiter 13 is provided to limit the region in the advancing direction image Si (Vi) which the edge extractor 1 scans to extract the edge pixels Pe based on the extracted lane contour signal Smc.

Figure 13:
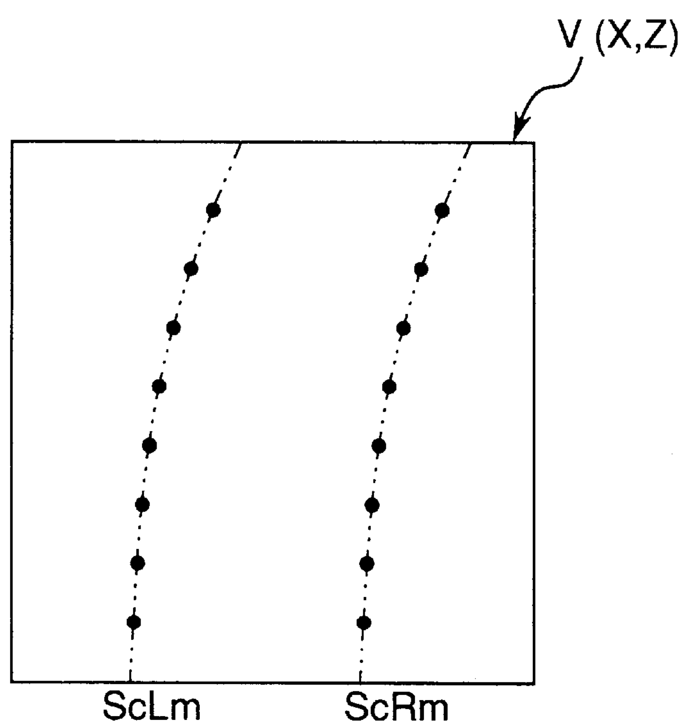
FIG. 13 is a graph for explaining the determination of a representative contour line by the region limiter of FIG. 2.

With reference to FIG. 13, the region limitation by the region limiter 13 is described. The region limiter 13 obtains crossing points of the extracted matching contour lines (straight or curve) ScRm and ScLm in FIG. 12 with corresponding horizontal scanning lines in the X-Z coordinate system. This can be performed in a manner similar to those described in FIG. 5, but is expressed in the x-z coordinate system. As best shown in FIG. 13, a plurality of crossing points are obtained with respect to the matching contour lines ScLm and ScRm.

The region limiter 13 converts the X-Z coordinate system to the x-z coordinate system by the following equation, in order to express these crossing points in the perspective view Vi.

$$x=FX/(Z \cos \theta+H \sin \theta) \quad (8).$$

$$z=F(H \cos \theta+Z \sin \theta)/(Z \cos \theta-H \sin \theta) \quad (9).$$

The parameters used in equations (7) and (8) are the same as those used in equations (2), (3), and (4).

Thus, the plural crossing points on the matching lines ScLm and ScRm in X-Z plane of the view Vmc are converted to points (pixels) in the x-z plane corresponding to the advancing direction view Vi. Each of crossing points obtained from the matching line ScRm is joined to the neighboring point(s) to represent the contour line ScR by thus connected lines ScRr in the x-z plane (view Vi). Similarly, each of crossing points obtained from the matching line ScLm is joined to represent the contour line ScL by the connected lines ScLr.

Figure 14:
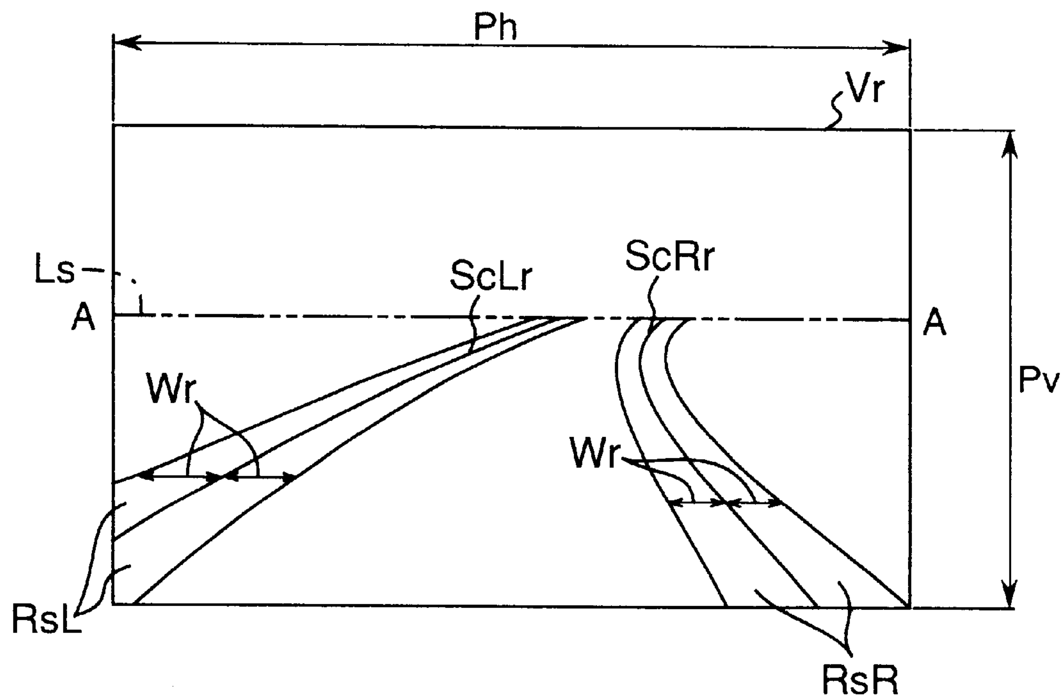
FIG. 14 is a graph for explaining the determination of a scanning region width by the region limiter of FIG. 2.

With reference to FIG. 14, an operation by the region limiter 13 is described below. FIG. 14 illustrates a view Vr wherein the representative contour lines ScRr and ScLr are shown. Then, the region limiter 13 decides a scanning region RsR around the obtained representative contour line ScRr. The scanning region RsR extends in the horizontal directions (right and left sides) along x-axis from the representative line ScRr by a predetermined length Wr.

This length Wr is determined to be greater than the possible travel that the lane marking Lm1 will make in the x-direction in the view Vi for one system cycle Cs, 33 ms for example, of the local positioning apparatus LP. Note that the travel of lane marking Lm1 in the view Vi is caused by the change of relationship between the imaging device 100 (automobile AM) and the lane markings Lm (road). The movement of the automobile AM in the X-direction, the curved lane (road), the tilting of the automobile with respect to the road surface, and the rolling of the automobile, for example, causes such altitude to change.

In this embodiment, the length Wr is determined based on previously determined driving conditions such as the dimensional feature data stored in the lane mark contour extractor 11. However, it is also possible to determine the length Wr in consideration of the current state such as a moving speed of the imaging device 100 and a configuration of the lane.

Similarly, the region limiter 13 obtains a representative contour line ScLr, and a scanning region RsL around the contour line ScLr. Then, the region limiter 13 produces a region data signal Sr including the data of the obtained scanning regions RsR and RsL.

Figure 15:
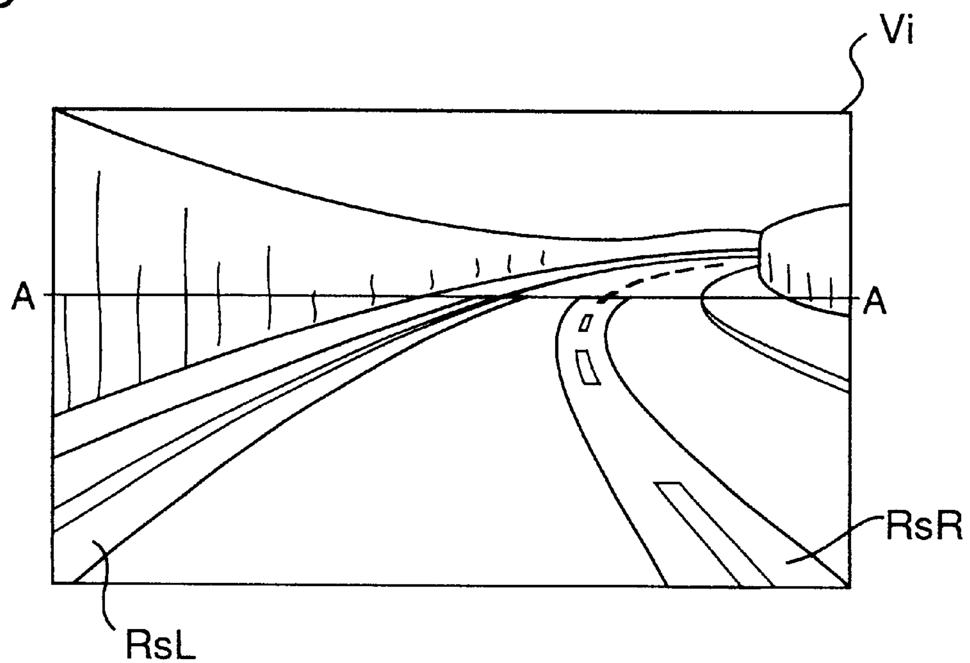
FIG. 15 is a graph showing the view V1 having the scanning regions obtained by the region limiter of FIG. 2 superimposed therein.

Referring back to FIG. 2, the edge extractor 1 is further connected to the region limiter 13 for receiving the region signal Sr therefrom. Then, the edge extractor 2 superimposes the scanning regions RsR and RsL on the view Vi, as best shown in FIG. 15.

Thereafter, the edge extraction (filtering) process is applied not to the bottom section Sb but only to these scanning regions RsR and RsL. Thus, the amount of data to be scanned is further reduced from the amount of data scanned just after starting of the local positioning operation, and is free from the noise that was removed by the lane mark contour extractor 11.

However, when no information effective for guiding the automobile AM is detected by the lane contour line extractor 11, the matching operation 9 suppresses its operation on receipt of the error signal See. In this case, the edging extractor 1 performs the edged extraction operation based on the image data Si without the region data signal Sr.

Referring back to FIG. 2, the current position detector 15, the curvature detector 17, and the yaw angle detector 19 are connected to the lane mark contour detector 11 each for receiving the signals Smc or See therefrom.

With reference to FIG. 12, the operation of the current position detector 15 is described herebelow. The current position detector 15 determines the positions on the matching lines ScLm and ScRm with the X-axis, where Z=0 as a left-side lane position HL and a right-side lane position HR, respectively, based on the signal Smc. Then, a center point between both side lane positions HL and HR as a lane center position HC that is expressed as (HC, 0) in the X-Z system. Since the imaging device 100 is positioned on the original point 0 of the X-Z coordinate system, the current position of the imaging device 100, or the automobile AM with respect to the lane (road) can be detected as being shifted from the center of the lane LM by the distance −HC. Then the current position detector 15 produces a position detection signal Shc indicative of that shift distance −HC.

As is apparent from the above, the current position of the imaging device 100 with respect to the lane can be detected correctly regardless of the shapes, straight or curved, of the lane based on the signal Smc. Furthermore, it is needless to say that any value other than “zero” can be adapted as the value of Z.

The curvature detector 17 obtains the curvature of the lane based on the equation (6) when the matching operator 9 matches a curved line to the lane contour lines based on the signal Smc. In this embodiment, the curvature radius of the matched arc line is detected as the curvature of the current lane when that matched arc has a radius greater than 600 m. Then, the curvature detector 17 produces a curvature detection signal Scu indicating thus detected radius.

The yaw angle detector 19 detects the tilting angle $\alpha$ of the matched contour lines ScRm or ScLm with respect to the X-axis (Z=0) based on the signal Smc. Then, the yaw angle detector 19 produces a yaw angle signal Sy indicative this tilting angle α.

Note that each of the current position detector 15, the curvature detector 17, and the yaw angle detector 19 suppresses its operation on receipt of the signal See to prevent a positioning operation based on the wrong lane information. However, it is also possible to obtain the current position, the curvature, and yaw rate based on the signal See including the detected information.

Figure 16:
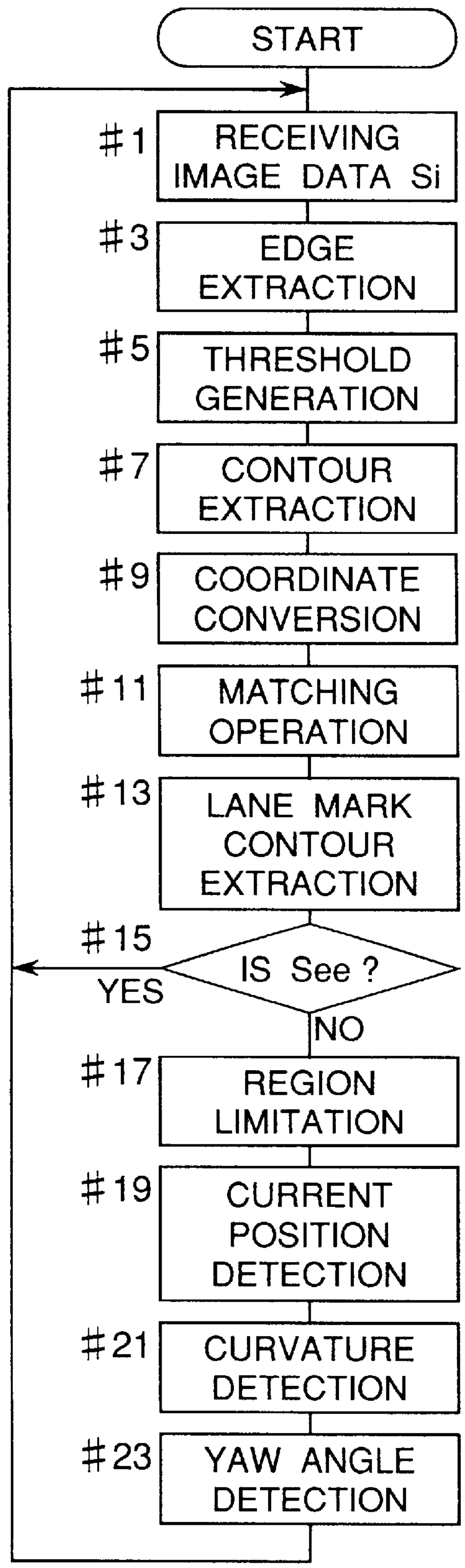
FIG. 16 is a flow chart showing the operation blocks of the local positioning apparatus of FIG. 2.

Referring to FIG. 16, the operation block of the local positioning apparatus LP1 is shown. First, the local positioning apparatus LP1 is turned on, the digital imaging device 100 is also turned on to obtain the advancing direction image Vi to produce the digital image data Si.

At block #1, the edge extractor 1 receives the image data Si from the imaging device 100.

At block #3, the edge extractor 1 extracts the edge pixels from the image data Si to produce the extracted edge pixel signal Sx.

At block #5, the threshold generator 3 determines the threshold Eth based on the density of edge pixels in the extracted edge pixel signal Sx.

At block #7, the contour extractor 5 extracts a line of each lane marking image from the extracted edge signal Sx with respect to the threshold Eth, then produces the contour pixel data signal Sc.

At block #9, the coordinate convertor 7 converts the coordinate system to obtain a bird's-eye view of the contour extracted view Vc. Then, the coordinate convertor 7 produces the coordinate converted image signal Scc.

At block #11, the matching operator 9 determines the formulas of the inner edge contour lines in the data Scc by matching an arc or a straight line by utilizing the Hough transformation of each pixel of contour data in signal Scc. Then, the matching operator 9 produces the matching signal Sm including such dimensional information data of matching straight line or arcs.

At block #13, the lane mark contour extractor 11 compares the dimensional features of the matched contour lines in the signal Scc with the dimensional feature data stored therein. The lane mark contour extractor 11 extracts the true pair of counter lines of the lane on which the automobile AM (imaging device 100) currently moves or is located, and produces the extracted lane contour signal Smc or the error signal See.

At block #15, it is judged whether the signal produced at block #13 is the error signal See, or not. When it is YES, meaning that the signal See is produced, the procedure returns to block #1. However, when it is NO, meaning that the extracted lane contour signal Smc is produced at block #13, the procedure advances to the next block #17.

At block #17, the region limiter 13 scans regions around the lane markings Lm in the digital image data Vi based on the signal Sm, and produces the region signal Sr.

At block #19, the current position detector 15 determines the current position with respect to the lane (road) based on the signal Smc. The signals Smc and Sr are transferred to the next block #21.

At block #21, the curvature detector 17 obtains the curvature of the lane based on the signal Smc, and produces the curvature detection signal Scu. The signals Smc and Sr are transferred to the next block #23.

At block #23, the yaw angle detector 19 detects the tilting angle α based on the signal Smc, and produces yaw angle signal Sy. Then, the region signal Sr is transferred to block #1, and the system cycle Cs starting from block #1 to block #23 repeats until the local positioning apparatus LP1 is turned off.

Figure 17:
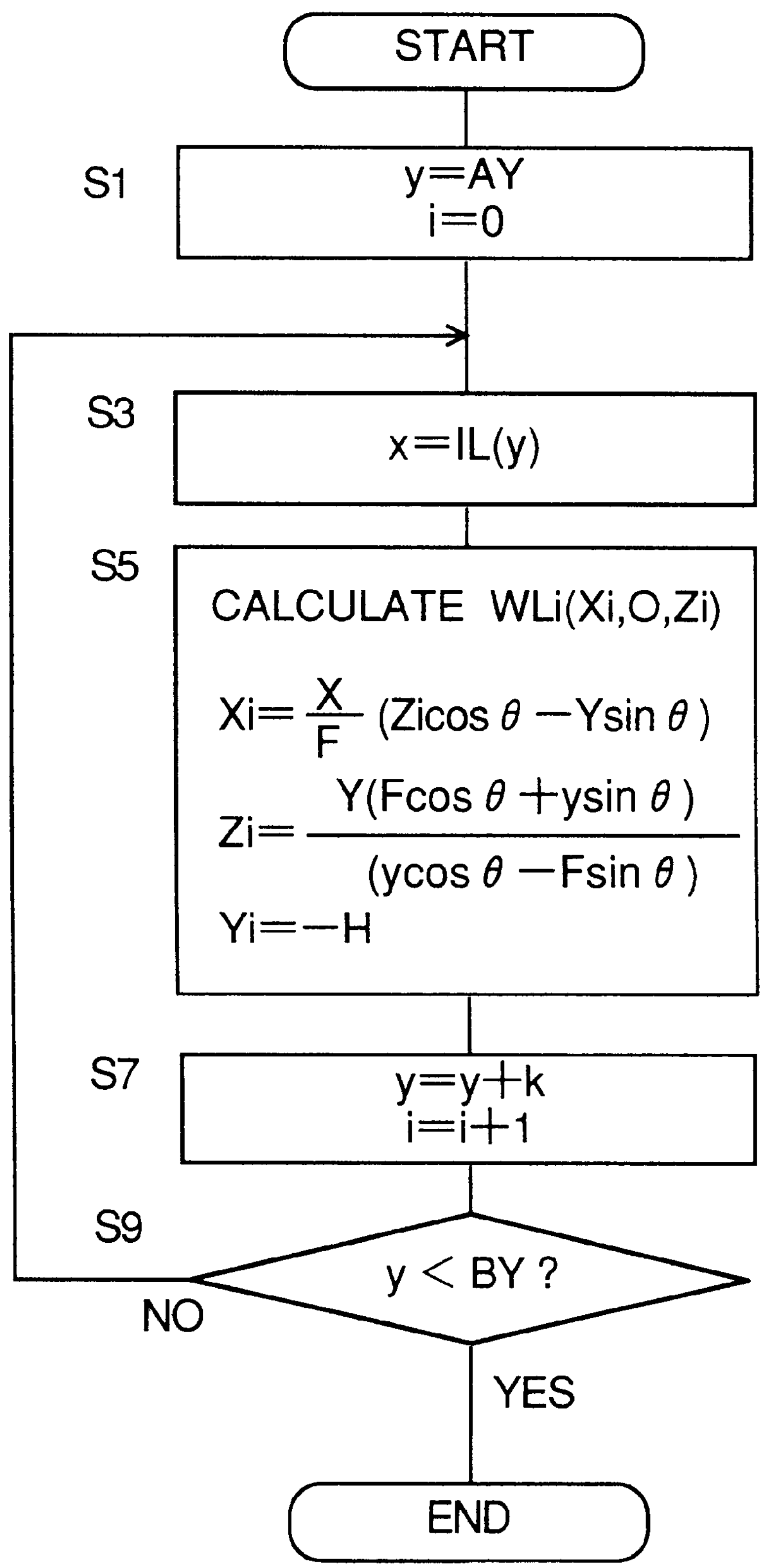
FIG. 17 is a flow chart showing details of the operation block #9 of FIG. 16.

Referring to FIG. 17, the details of the operation block #9 for coordinate conversion are shown.

At step S1, "AY" and "0" are set to "y" and "i", respectively. "AY" is a predetermined number corresponding to the vertical position "A" of the scanning line Ls, and is 31 for example.

At step S3, the coordinate conversion starts from the pixel $Pe_{i=0}$(y=AY,x) on the first horizontal scanning line Ls.

At step S5, the coordinate "x" of the pixel Pe(AY,x) is obtained.

At step S5, the coordinate for "$Pe_i$(y,x)" is converted into the Y-Z coordinate based on the equations (2), (3), and (4).

At step S7, "y" and "i" are incremented by "k" and "1", respectively. "k" is an integer and preferably divisor for "A".

At step S9, it is judged whether "y" is smaller than "BY," which indicates that the bottom line of the image Vc has been encountered, or not. "BY" is a predetermined number corresponding to the vertical position of the image Vi, and is −130 for example. When "k" is not a divisor for "A," any value smaller than "k" by "1" can be set.

An answer of "YES" in S9 indicates that none of the extracted contour pixels Pe in the view Vcc are yet applied with the coordinate conversion. Then, the procedure returns to step S3.

However, when the answer is "NO," the procedure terminates. Thus, the view Vc in the signal Sc is converted from the perspective view to the bird's-eye view in X-Z coordinate.

Figure 18:
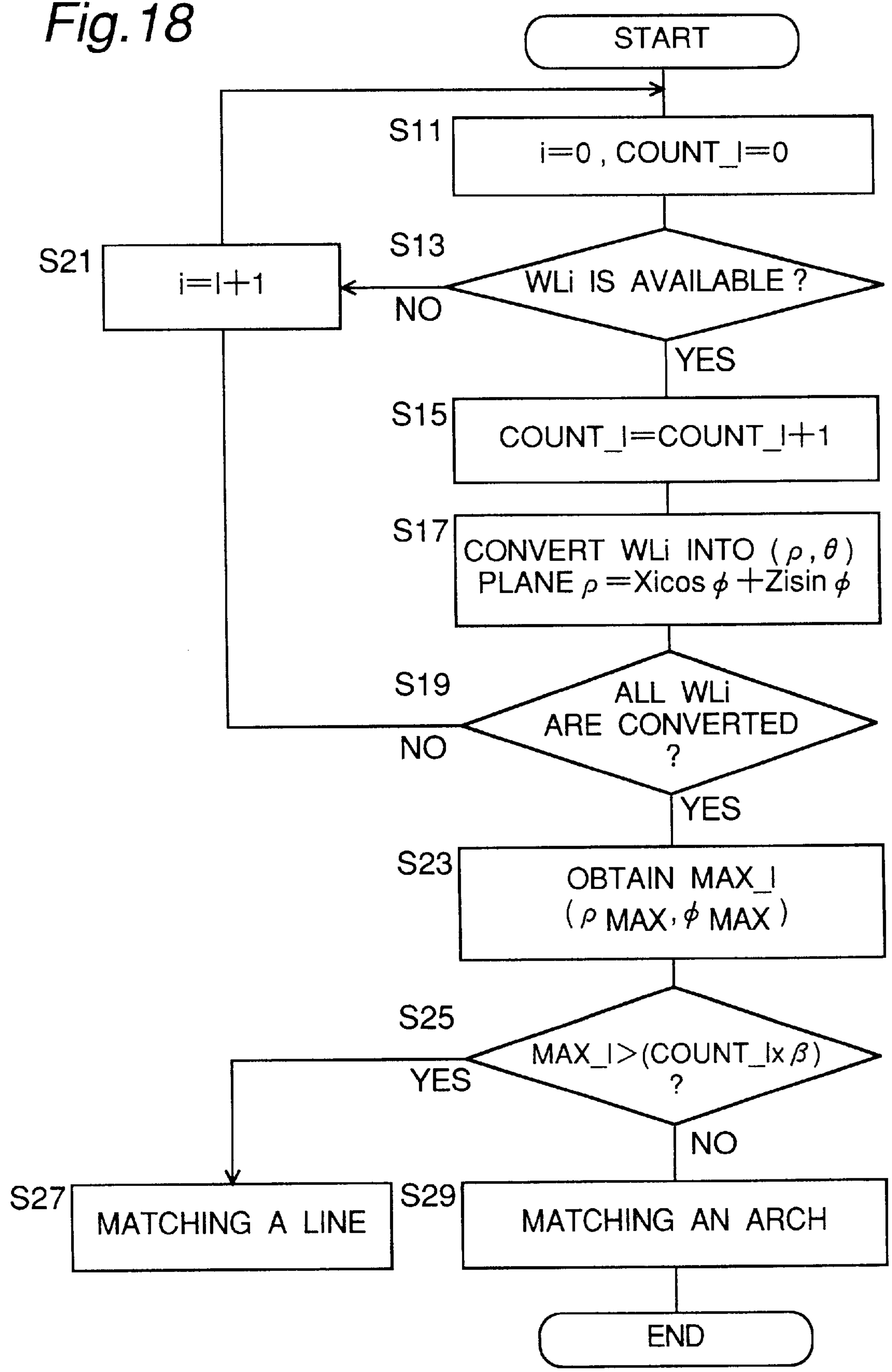
FIG. 18 is a flow chart showing details of the operation block #11 of FIG. 16.

Referring to FIG. 18, the details of the operation block #11 for matching operation are shown.

At step S11, "0" is set to both "i" and "count_1." Thus, the pixel WLi(i=0) is determined to be applied with the Hough transformation.

At step S13, it is judged whether pixel WLi is available. Answer of "YES" in S13 indicates that WLi is available in the view Vc (signal Sc), in which case the procedure advances to step S17. However, when the answer is "NO," the procedure advances to step S21.

At step S15, "count_1" is incremented by "1". Then, the procedure advances to step S17.

At step S17, WLi is Hough transformed to be a pixel in a (ρ, ϕ) plane based on the equation (5).

At step S19, it is judged whether all pixels were Hough transformed to the (ρ, ϕ) plane, or not. When it is "NO," the procedure advances to step S21.

At step S21, "i" is incremented by "1". Then, the procedure returns to step S13 for examining the next pixel Wli(i=1). However, at step S19, an answer of "YES" indicates that all pixels are converted and the procedure advances to step S23.

At step S23, Max_1($\rho_{max}$, $\phi_{max}$) at which the maximum number pixels are located in the (ρ, ϕ) plane is obtained.

At step S25, it is judged whether Max_1 is greater than (count_1×β), or not. Note that "Max_1" and "(count_1×β)" correspond the previously described crossing frequency Fc and the threshold Fth, respectively. "β" is a positive number greater than zero but smaller than 1, and is preferably 0.4.

If the answer to S25 is "YES," which indicates that the Hough transformed curves cross at the same point, the procedure advances to step S27.

At step S27, a line expressed by the equation (6) can be obtained for matching the extracted contour line. The procedure then terminates.

However, at step S29, if the answer is "NO," which indicates that the Hough transformed curves do not cross at the same point, the procedure advances to step S29.

At step S29, an arc expressed by the equation (7) can be obtained for matching the extracted contour line. Then, the procedure terminates.

Second Embodiment

Figure 19:
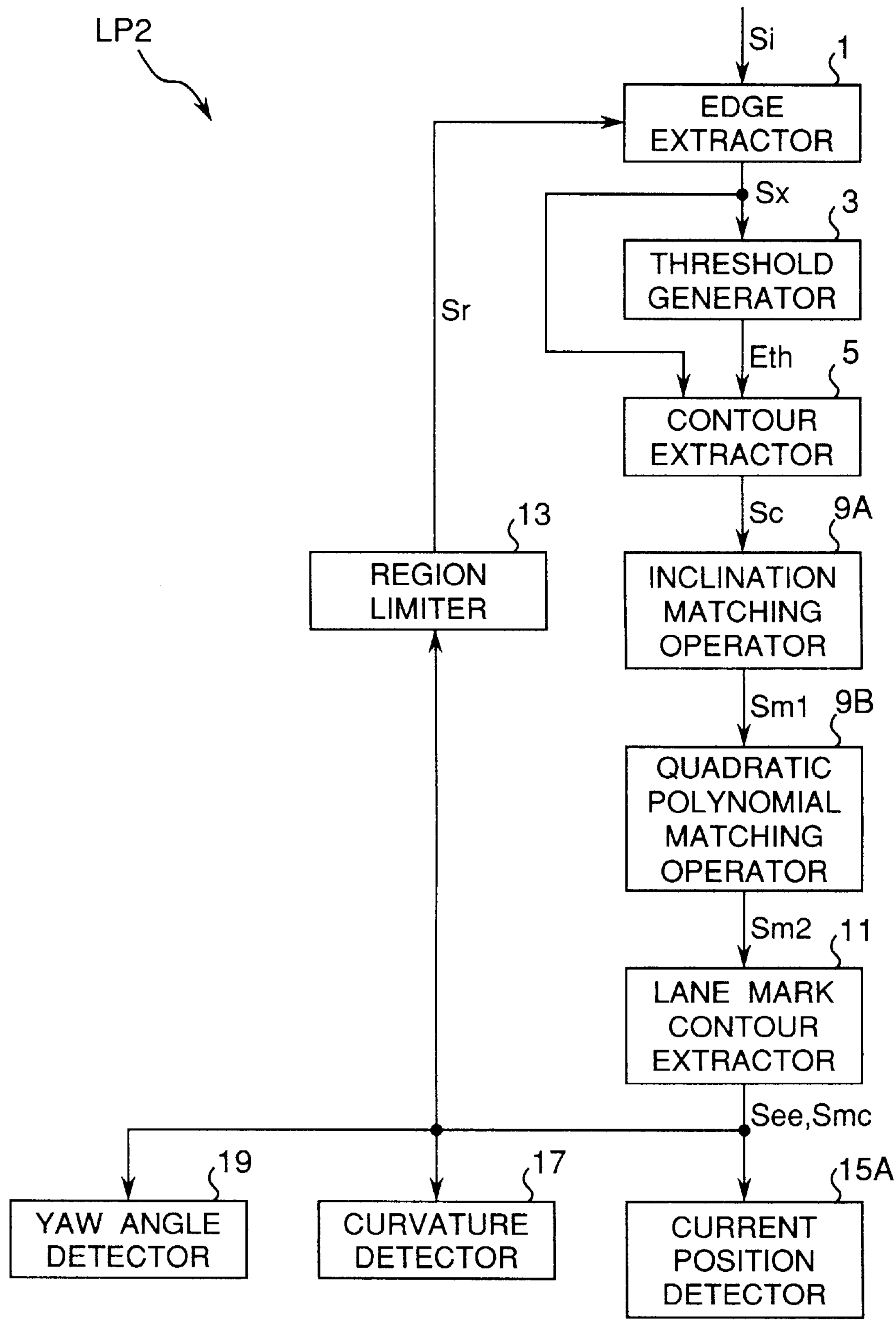
FIG. 19 is a block diagram showing an alternative of the local positioning apparatus of FIG. 2.

Referring to FIG. 19, an alternative of the local positioning apparatus LP1 of FIG. 2 is shown. The local positioning apparatus LP2 has a construction very similar to that of the first embodiment, however, the coordinate convertor 7 in FIG. 2 is removed from FIG. 19. As a result, it is to be noted that all operations in this embodiment are performed based on the signals bearing perspective view.

Furthermore, the matching operator 9 is replaced by an inclination matching operator 9A and a quadratic polynomial matching operator 9B. The current position detector 15 is also replaced by a modified one.

The inclination matching operator 9A is connected to the contour extractor 5 for receiving the contour extracted signal Sc therefrom. The inclination matching operator 9A applies an inclination matching operation to each pixel in the extracted contour lines in signal Sc individually.

Before describing the inclination matching operation, the advancing direction views Vi and Vc when the automobile AM is driving on a curved road are described with reference to FIG. 20. When the road is making a curve to the right, the left side contour line ScL, located on the outside of the curve, appears as if it extends linearly in the advancing direction from the bottom of the image Vi.

Similarly, the right side contour line ScR, located on the inside of the curve, also looks like it extends linearly in the advancing direction but rapidly deviating to the curving direction (right side) from the middle portion thereof. These characteristics are common in the advancing direction view of the curved road, or lane.

Based on this fact, the inclination matching operator 9A applies an inclination matching of the extracted contour lines ScR (ScR') and ScL in the signal SC. First, an inclination angle of a line connecting two pixels located on the neighboring two horizontal scanning lines (Lh) thereat are determined. The determined inclination angle is stored as an inclination (SLi_i+1) at a center between these neighboring two pixels. Therefore, no inclination angle is available with respect to any pixel having no pixel on the neighboring scanning line, such as the center marking Lm2 being separated in several portions (FIG. 4).

Figure 20:
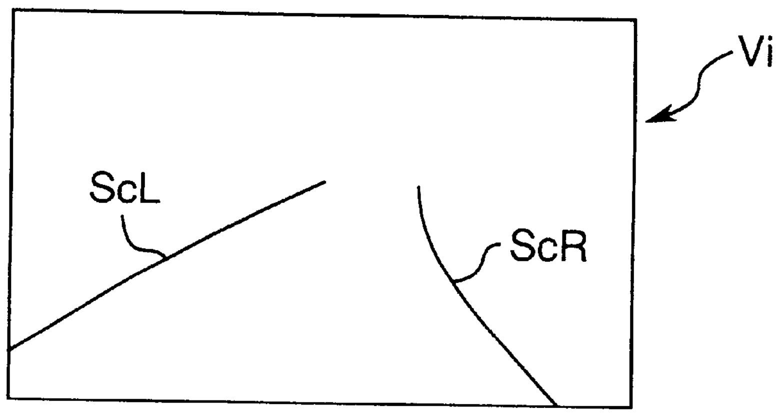
FIG. 20 is a graph showing the advancing direction image view Vcc when the automobile is driving on a curved lane.
Figure 21:
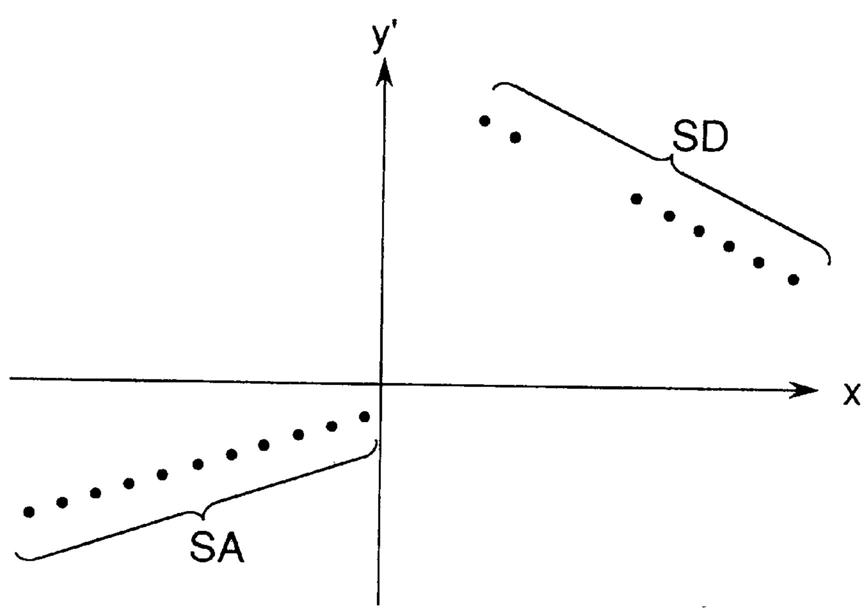
FIG. 21 is a graph showing sets of dots each indicating an inclination of the extracted contour line, obtained by the inclination matching operator of FIG. 19.
Figure 22:
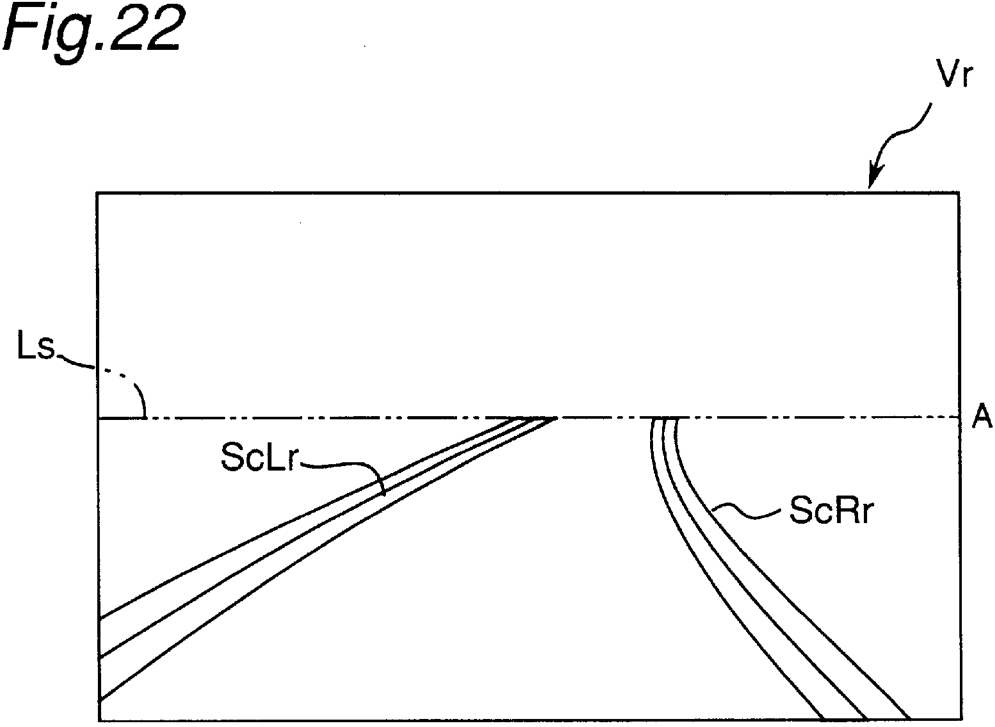
FIG. 22 is a graph for explaining a region determining operation based on the matched lines obtained by the matching operators of FIG. 19.

Referring to FIG. 21, the inclinations obtained from the signal Sc corresponding to the view of FIG. 20 are shown. The dot sets SA in the left-bottom section and SD in the right-top section correspond to the inclinations with respect to the right contour lines ScR and the left contour line ScR, respectively. Thus, from the outer curved line (ScL in FIG. 20) which seems like a straight line in the advancing direction view Vcc, the dot set SA along a line ascending with respect the x-axis is obtained. From the inner curved line (ScR in FIG. 20) which makes a curve from the middle portion thereof, the dot set SD along a line descending the x-axis is obtained. Note that "y'" is a differential of "y."

Then, the inclination matching operator 9A applies the Hough transformation to each of the dot sets SA and SD to apply a line expressed by the following equation:

$$y'=2Dx+E \quad (10).$$

"y'" is a differential of "y," and therefore represents the variation of inclination of the following quadratic equation:

$$y=Dx^2+Ex+F \quad (11).$$

where "D", "E", and "F" are constants. The value of "D" indicates the curving state and degree of the contour line. For example, when the extracted contour line corresponds to the outer curved line, "D" is greater than zero. Otherwise, "D" is equal to or less than zero.

Therefore, according to the value of "D," one of the following different equations is selectively applied to the dot sets, as follows.

When "D">0, the equation (11) is applied.

When "D"≦0, an equation (12) for a line, similar to the equation (10), induced utilizing the Hough transformation is applied.

$$x'=2Gy+H \quad (12).$$

A quadratic polynomial similar to the equation (11), expressed by the following equation (13) is applied.

$$x=2Gy^2+Hy+I \quad (13).$$

"x'" is a differential of "x," and represents the variation of inclination of the quadratic polynomial (13). "G," "H," and "I" are constants.

Thus, the inclination matching operation 9A converts the signal Sc that is simply a group of dots in the image Vc into data indicating the inclination of each of the contour lines. Based on the converted inclination information data, further information indicating the curving conditions can be obtained. Then, the inclination matching operator 9A produces an inclination matching signal Sm1 indicative of the information obtained by the inclination matching.

The quadratic polynomial matching operator 9B is connected to the inclination matching operator 9A for receiving the signal Sm1 therefrom. The quadratic polynomial matching operator 9B applies a quadratic polynomial to each of the extracted contour lines ScR (ScR') and ScL in signal Sc1 individually.

When the signal Sm1 indicates that the equation (10) was applied, the quadratic polynomial matching operator 9B substitutes the values of x-y coordinate for the each contour pixel in Sc for "x" and "y" of the equation (11) to calculate the value of "F" successively. Among the calculated values of "F," the value that appears most frequently is determined as the constant "F" of equation (11).

However, when the signal Sm1 indicates that the equation (13) was applied, the quadratic polynomial matching operator 9B substitutes the values of the x-y coordinate for the each contour pixel in Sc for "x" and "y" of the equation (14) to calculate the value of "I" successively. Among the calculated values of "I," the value that appears most frequently is determined as the constant "I" of equation (14). Then, the quadratic polynomial matching operator 9A produces an inclination matching signal Sm2 indicative of that information obtained thereby.

Note that when "D" is zero, the equation (11) becomes y=Ex+F. Thus, the curving conditions of the lane can be determined by applying the quadratic polynomials regardless of whether the road is straight or curved.

The modified current position detector 15A operates based on the signal Smc including the information of signals Sm1 and Sm2, as follows. Furthermore, note that the image of signal Smc is a perspective view but not a bird's-eye view.

Figure 23:
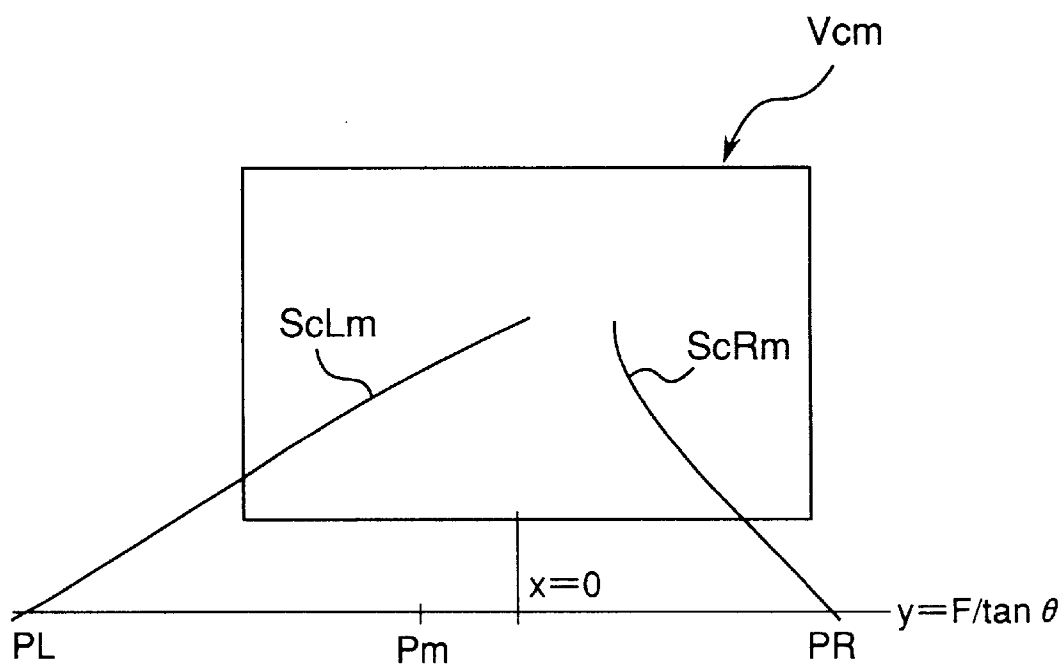
FIG. 23 is a graph for explaining an operation of the current position detector of FIG. 19.

Referring to FIG. 23, the operation of the region limiter 13 in this embodiment is shown. The view Vr wherein the representative contour lines ScRr and ScLr that are obtained based on the equations (12) and (11) applied by the matching operators 9A and 9B.

Furthermore, with reference to FIG. 23, the operation of the current position detector 15A is described herebelow. The current position detector 15A determines the positions on the matching lines ScLm and ScRm with the x-axis corresponding to the position where Z=0 as a left-side lane position PL and a right-side lane position PR, respectively.

Since the view Smc is not a bird's-eye view in this embodiment, the x-axis position is obtained based on the following equation.

$$y=F/\tan\theta \quad (14).$$

Then, a center point Pm between both side lane positions PL and PR as a lane center position Pm corresponding to the center position HC (HC, 0) in the X-Z coordinate system in FIG. 12. The center position Pm in the view Vcm is in a proportional relationship with the position of HC in the X-axis. Therefore, the position Pm in z-axis is simply converted to the "HC" based on a previously determined constant. Therefore, the current position detector 15A produces a position detection signal Shc indicative the shift distance −HC with respect to the center line (x=0).

Figure 24:
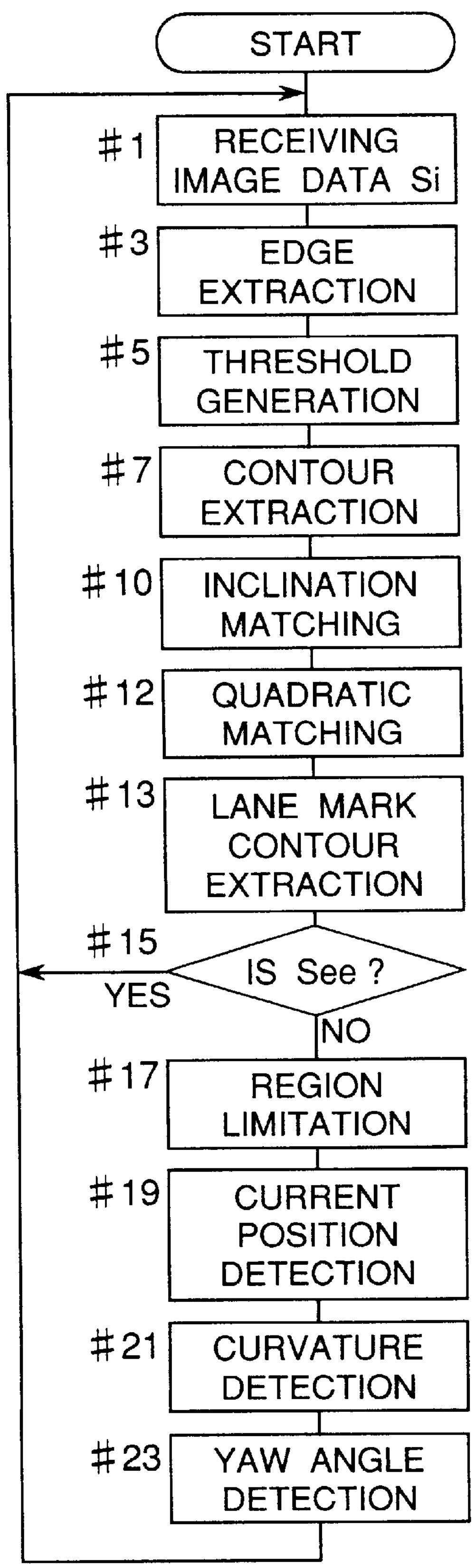
FIG. 24 is a flow chart showing the operation blocks of the local positioning apparatus of FIG. 19.

Referring to FIG. 24, a flow chart showing the operation blocks of the local positioning apparatus LP2 of FIG. 19 is shown. The operations in this embodiment are very similar to those shown in FIG. 16, but the operation block #9 for coordinate conversion is removed, the operation block #11 for the matching operation is replaced by an inclination matching block #10 and a quadratic polynomial operation block #12.

At block #10, the inclination matching operator 9A determines the inclination angle of each contour line at every horizontal scanning line. Furthermore, the curving conditions of the lane markings Lm are determined. Then, the inclination matching signal Sm1 including such dimensional information data is produced, as described in the above.

At block #12, the quadratic polynomial matching operator 9B applies the quadratic polynomials to the inclination matching signal Sm1. Then, the operator 9B determines curving conditions of the lane, and produces the matching signal Sm2, as described in the above.

Figure 25:
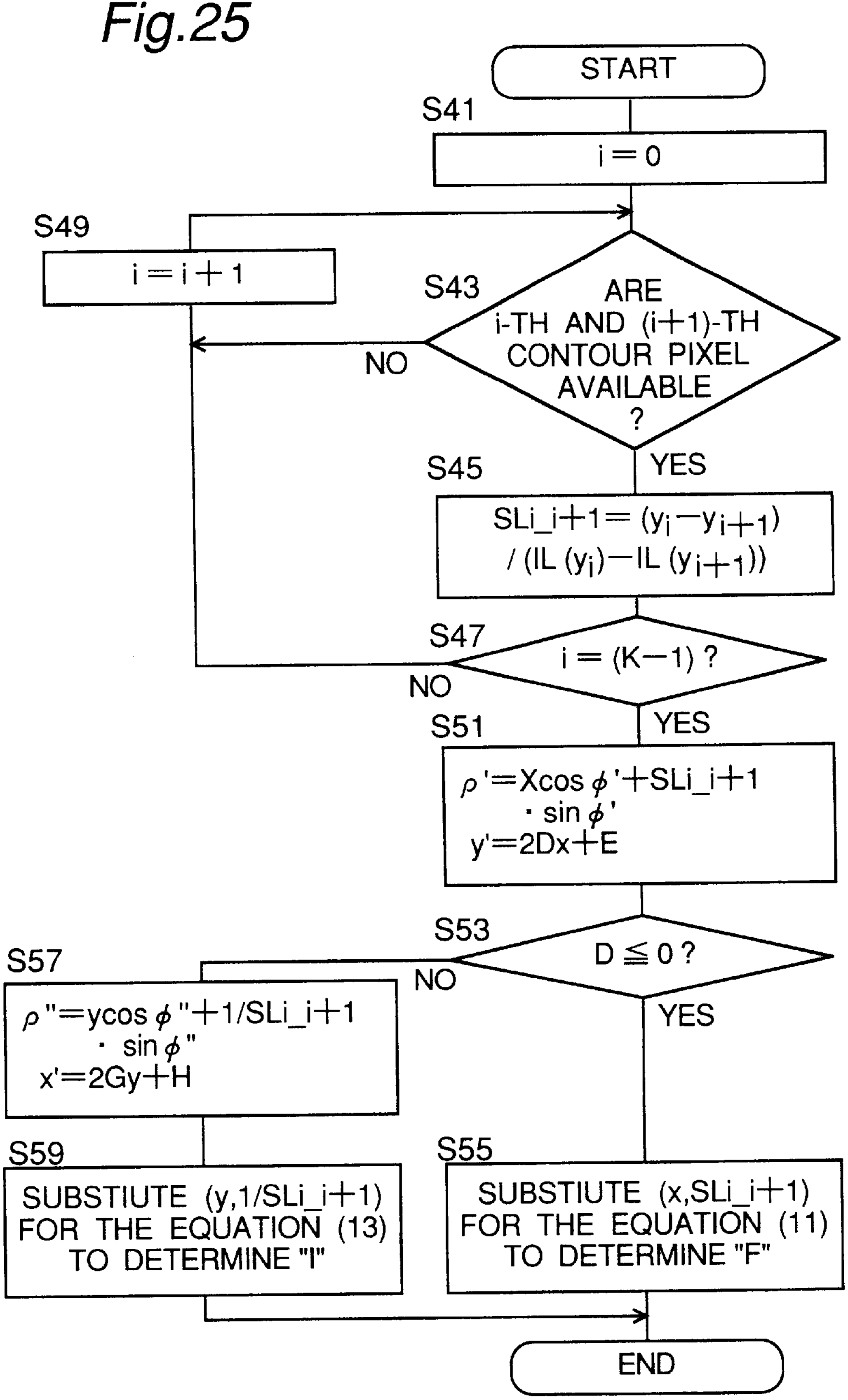
FIG. 25 is a flow chart showing details of the operation block #10 of FIG. 24.

Referring to FIG. 25, the details of the operation block #10 for inclination matching are shown. Herebelow, the inclination matching operation is performed with respect to one of contour lines ScL and ScR (ScR'), because the operation is the same for each contour line.

At step S41, "0" is set to "i."

At step S43, it is judged whether both the i-th and (i+1)-th contour pixels are available in the signal Sc, or not. When the answer in S43 is "YES," the procedure advances to step S45. However, when it is "NO," the procedure advances to step S47.

At step S45, the inclination angle SLi_i+1 of a line connecting the i-th and (i+1)-th contour pixels is determined based on the following equation of $$SLi\_i+1=(y_i-y_{i+1})/(IL(y_i)-IL(y_{1+1})) \quad (15).$$

where "IL($y_i$)" represents the coordinate for the i-th extracted contour pixel.

At step S47, it is judged whether "i" is less than (K−1), or not. Note that "K" is an integer corresponding to the number of horizontal scanning lines Lh used for extracting the contour pixels Pe in the operation block #7.

When the answer in S47 is "NO," the extracted contour pixel Pe which is not subject to the inclination obtaining process at step S45 remains. Then, the procedure advances to step S49.

At step S49, "i" is incremented by "1", and then the procedure returns to step S43.

However, at step S47, an answer of "YES" indicates that inclinations have been obtained with respect to the all extracted contour pixels included in a single contour line. Then the procedure advances to step S51.

At step S51, the inclination data (x, SLi_i+1) are applied with the Hough transformation of equation (5), which can be shown as $\rho'=X\cos\phi'+(SLi\_i+1)\sin\phi'$. Then a line expressed by the equation (10), y'=2 D x+E, is matched.

At step S53, it is judged whether "D" is equal to or less than zero, or not. An answer of "YES" indicates that the currently examining contour line corresponds to the inner curved line. Then, the procedure advances to step S55.

At step S55, the equation (10), y'=2Dx+E, is integrated to obtain the equation (11), $y=Dx^2+E\,x+F$. Then, substitute (x, SLi_i+1) for the equation (11) to determine "F," and the procedure terminates.

Third Embodiment Referring to FIG. 26, an alternative of the local positioning apparatus LP2 of FIG. 19 is shown. The local positioning apparatus LP3 has a construction substantially the same as that of the second embodiment, wherein the yaw angle detector 19 in FIG. 19 is removed. However, the moving speed detector 200, the GPS receiver 300, the electric control unit (ECU), and the navigation apparatus 500 are connected to the local positioning apparatus LP3, as best shown in FIG. 26, for receiving the local positioning signals Smc, See, and Scu therefrom. Thus, an example of the local positioning system LPS in FIG. 1 are provided.

The map memory 25 is provided for memorizing the geographical features of the road such as road maps, landmarks, and curved positions. The GPS receiver 300 is provided for receiving the GPS signals from the navigational satellites to obtain the global positioning data such as location, velocity, and altitude in the global view point. The GPS receiver 300 further detects the current local and global position of the automobile AM based on the global position data and the local positioning Smc accurately, and produces a local and global positioning signal Sg.

The navigation apparatus 500 includes a curved position setter 21, a map memory 25, a driving safety estimator 27, and an alarm. The curved position setter 21 is connected to the curvature detector 17 and the GPS receiver for receiving the curvature detection signal Scu and the local and global positioning signal Sg, respectively, therefrom.

The curved position setter 21 compares the detected radius indicated by the signal Scu with a predetermined curvature to produce a result signal having two levels. The result signal has a high level when the detected radius is greater than the predetermined curvature.

The map memory 25 is connected to the curved position setter 21 for receiving the result signal, the curvature detection signal Scu, and the local and global positioning signal Sg therefrom. On receipt of a high level result signal, the map memory 25 stores the current position (Sg) with respect to the detected curvature (Scu).

The driving safety estimator 27 is connected to the map memory 25, the moving speed detector 200, and the GPS receiver 300 for receiving the curvature (Scu) of curved road data, the current moving velocity Sv, and the local and global position data Sg, respectively, therefrom. Based on these information data, the driving safety estimator 27 judges whether the automobile AM can advance on the current curved road safely, or not. When it is judged "NO," which indicates that the automobile AM will not able to drive the curved road safely, the safety estimator 27 produces a warning signal including such estimation information.

The alarm 31 is connected to the driving safety estimator 27, and gives an alarm message to the driver on receipt of the warning signal therefrom.

The ECU 400 is connected to the driving safety estimator 27 of the navigation system 500, and actuates a driving system such as an engine to reduce the moving velocity of the automobile AM on receipt of the warning signal therefrom.

Note that the local positioning apparatus LP3 according to this embodiment can be prepared to have a construction substantially the same as that of the first embodiment (LP2; FIG. 2) instead of that of the second embodiment (LP1; FIG. 19).

Figure 27:
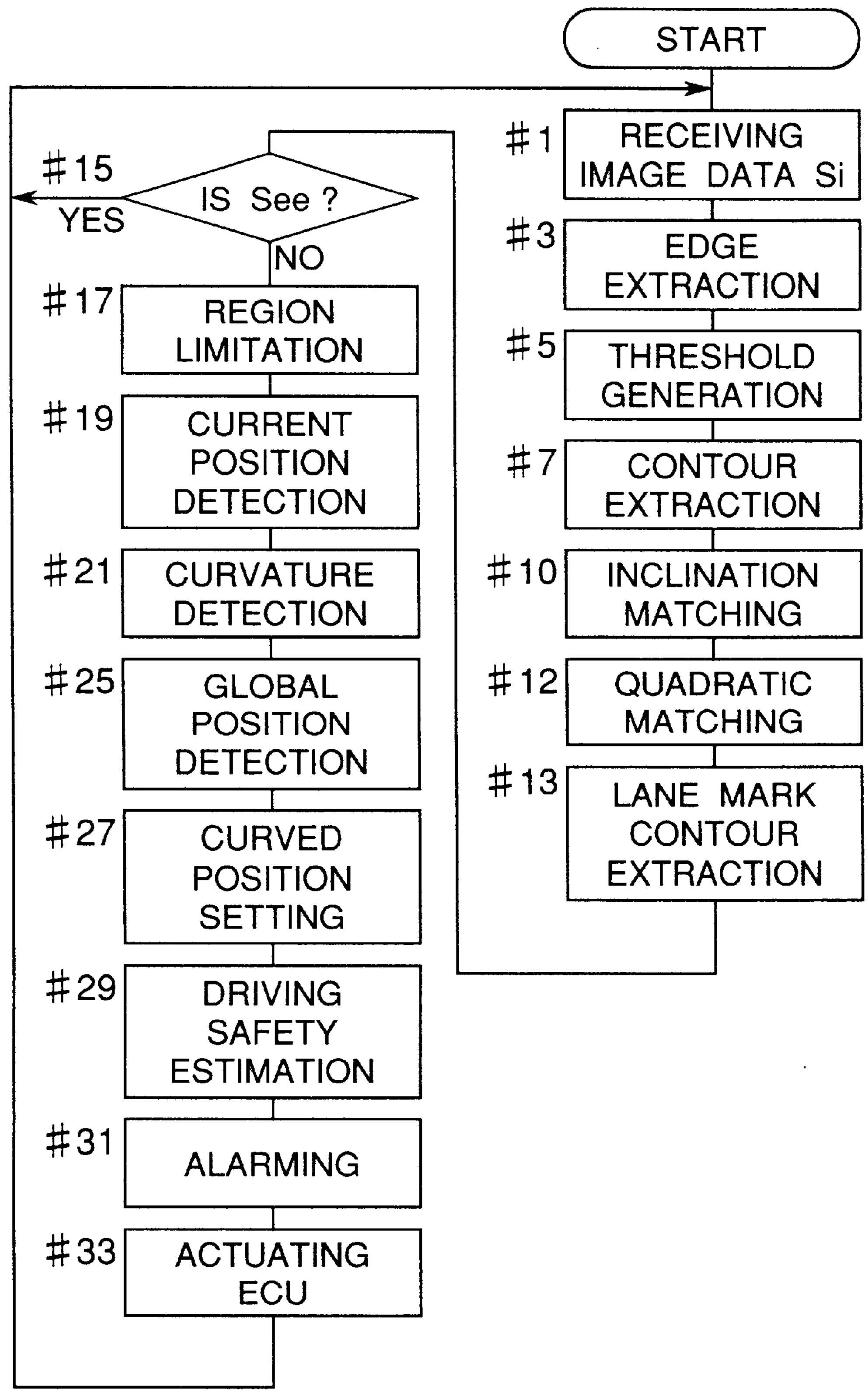
FIG. 27 is a flow chart showing the operation blocks of the local positioning apparatus of FIG. 26.

Referring to FIG. 27, a flow chart showing the operation blocks of the local positioning apparatus LP3 of FIG. 26 is shown. The operations in this embodiment are very similar to those shown in FIG. 24, but operation block #25 for global position detection, #27 for curved position setting, #29 for driving safety estimation, #31 for alarming, and #33 for actuating ECU are added after the operation block #21. Note that the operation block #23 for yaw angle detection in FIG. 24 is removed in this embodiment.

At block #25, the GPS receiver 300 detects the current local and global position.

At block #27, the curved position setter 21 detects the position of a curved road having a curvature greater than the predetermined curvature data.

At block #29, the driving safety estimator 27 judges whether the automobile AM can drive on the currently advancing curved road safely without reducing the moving speed, based on the data obtained at the preceding blocks #25 and #27, as follows.

Based on the current position data Sg, the estimator 27 judges whether any curved road ahead by a distance DD is recorded in the map memory 25, wherein "DD" is a safety distance providing the driver with a time which is long enough to take necessary operations to reduce the moving speed to the safety level. Therefore, "DD" should be determined in consideration of the possible driving conditions such as moving speed, road condition, the vehicle weight, and so on. For example, "DD" is set to 300 m in this embodiment.

With respect to such curved position, the driving safety is estimated based on the following inequality of $$R<V^2/Cv \quad (16),$$

wherein "R" is a radius of the curved road (FIG. 11), "V" is a moving velocity (Sv) of the automobile AM, and "Cv" is a constant determined in accordance with the driving ability of the automobile AM. When the inequality (16) is satisfied, the driving safety estimator 27 produces the warning signal. Note that the warning signal will be canceled immediately when the inequality (15) is not satisfied as a result of the braking operation.

At block #31, the alarm 31 gives an alarm on receipt of the actuating signal from the driving safety estimator 27.

At block #33, the electric control unit (ECU) actuates a carburetor's throttle to close and/or shift down the automatic transmission gear box for reducing the moving speed of the automobile AM.

Fourth Embodiment

Figure 28:
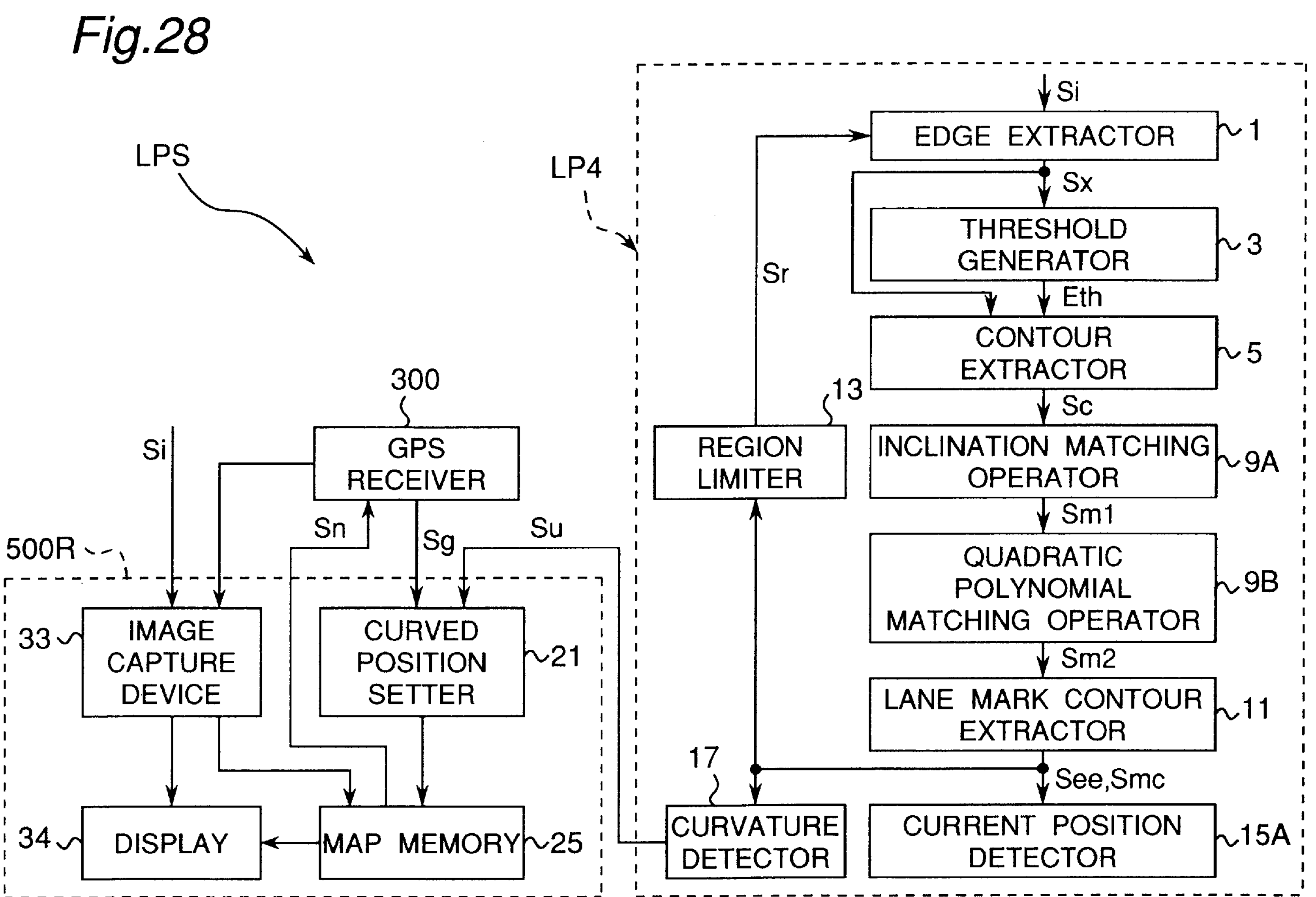
FIG. 28 is a block diagram showing an alternative of the local positioning apparatus of FIG. 27.

Referring to FIG. 28, an alternative of the local positioning apparatus LP3 of FIG. 26 is shown. The local positioning apparatus LP4 has a construction substantially the same as that of the third embodiment, wherein the moving speed detector 200 and the ECU 400 in FIG. 26 are removed, and the navigation apparatus 500 is replaced by a modified navigation apparatus 500R.

The modified navigation apparatus 500R includes the curved position setter 21 and the map memory 25 that are the same as the navigation apparatus 500 of FIG. 26. The apparatus 500 further includes an image capture device 33 and a display 34. The image capture device 33 is connected to the imaging device 100 and the GPS receiver 300 for receiving the advancing direction view signal Si and the position signal Sg, respectively, therefrom.

The image capture device 33 includes an image buffer memory such as a frame memory for storing the image data temporarily. According to the driver's instruction, the image capture device 33 captures one frame of image signal Si indicating the advancing direction view image Vi.

The map memory 25 is further connected to the image capture device 33 for receiving the captured one frame of image data Si (Vi) to record it on a suitable recording medium incorporated therein. For this purpose, a re-writable type of optical disk having a great storage capacity such as SD-ROM, PD, DVD-RAM, and so on can be used.

The display 34 is connected to the image capture device 33 for receiving the stored image signal (Si) therefrom to show the current advancing direction view image Vi through the image capture device 33. The display 34 is also connected to the map memory 25 to reproduce the advancing direction image Si or to display the geographical information stored in that medium. Note that the local positioning apparatus LP4 according to this embodiment can be prepared to have a construction substantially the same as that of the first embodiment (LP2; FIG. 2) instead of that of the third embodiment (LP3; FIG. 28).

Figure 29:
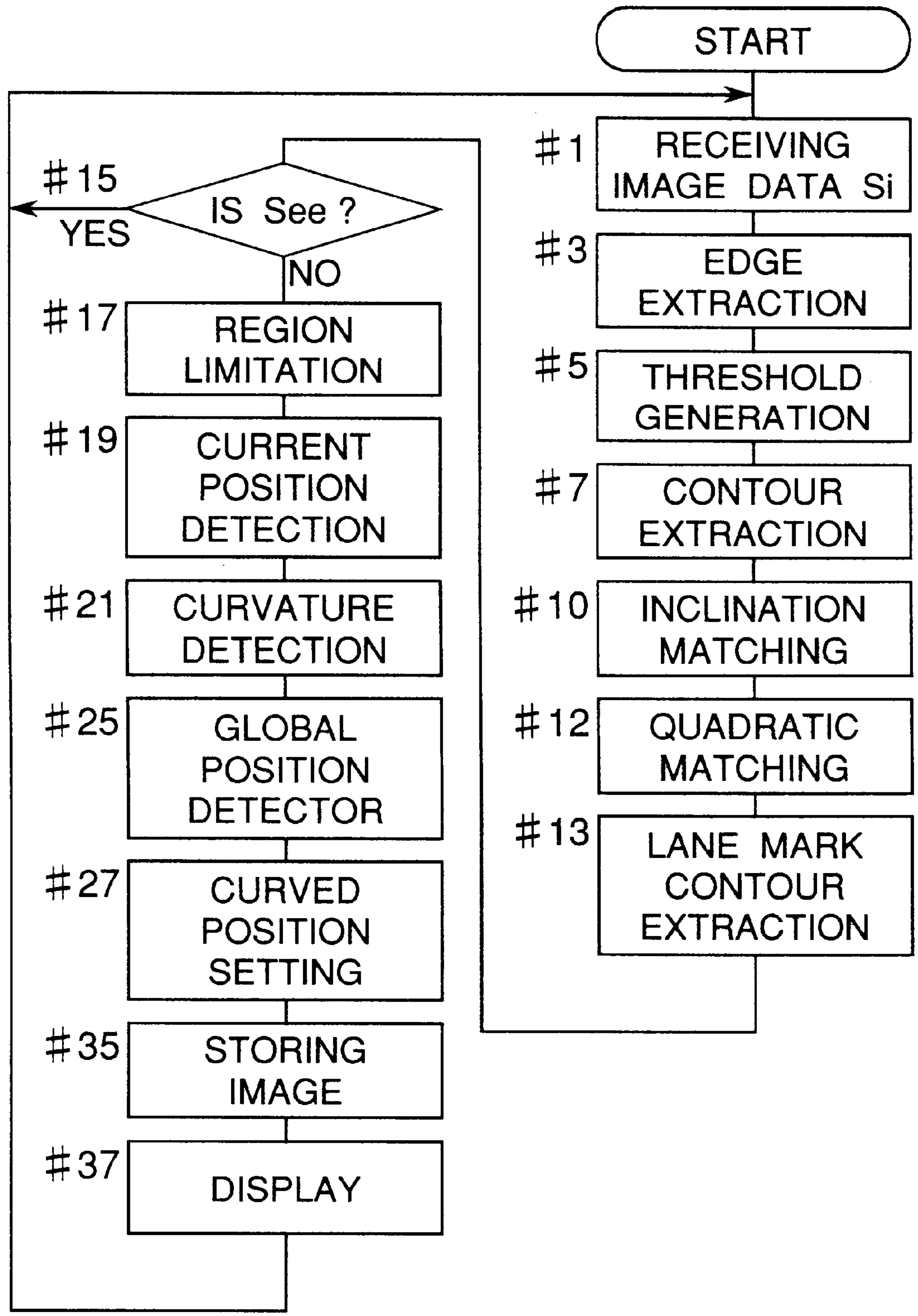
FIG. 29 is a flow chart showing the operation blocks of the local positioning apparatus of FIG. 28.
Figure 30:
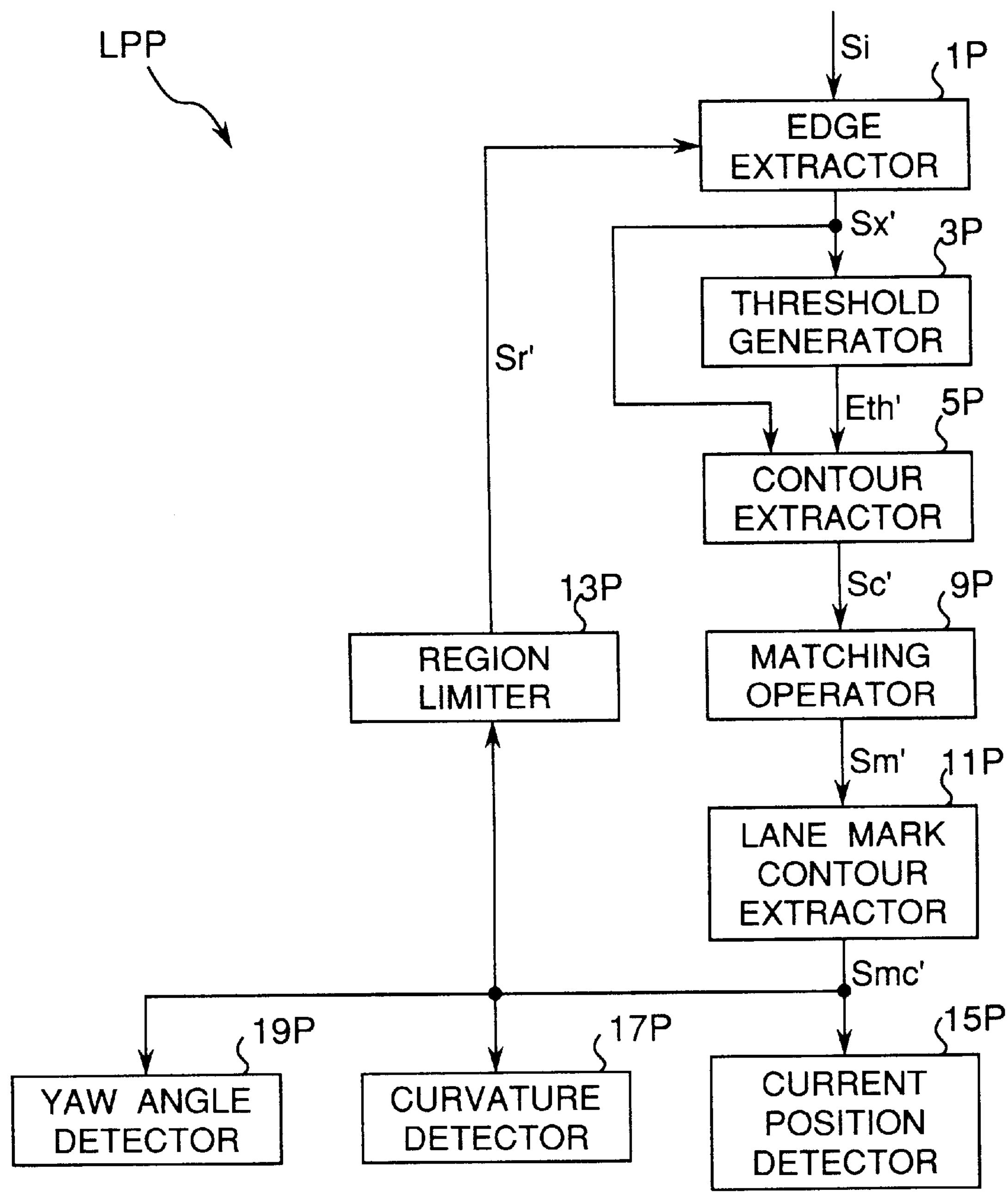
FIG. 30 is a block diagram showing a conventional local positioning apparatus.

Referring to FIG. 29, a flow chart showing the operation blocks of the local positioning apparatus LP4 of FIG. 28 is shown. The operations in this embodiment are very similar to those shown in FIG. 27, but operation blocks #29, #31, and #33 are replaced by an operation block #35 for image storing and #37 for display.

At block #35, the image capture device 33 captures the current view image Vi in a frame memory incorporated therein when it is operated by the driver. Then, the map memory 25 records the captured image Vi to the recording medium.

At block #37, the stored image Vi is shown in the display 34.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A position detecting apparatus for use with an object movable along a lane, said position detecting apparatus comprising:

an imaging device to be mounted on the object for capturing an image of a perspective view from the object in an advancing direction of the object along the lane and for generating a digital image signal representative of the perspective view including the lane;

a contour extraction means for extracting a contour of the lane from the digital image signal and for producing contour data indicative of the contour of the lane;

a conversion means for converting the contour data from the perspective view to a plane view so as to indicate dimensions of the contour data extracted by said contour extraction means correctly in the plane view and for producing coordinate converted data indicative of the contour data with correct dimensions in the plane view; and a feature detection means for detecting dimensional features of the contour of the lane extracted by said contour extraction means based on the coordinate converted data produced by said conversion means and for producing dimensional data indicative of the dimensional features of the contour of the lane.

2. A position detecting apparatus as claimed in claim 1, wherein the dimensional data produced by said feature detection means is indicative of a portion of the lane extending from the object in the advancing direction.

3. A position detecting apparatus as claimed in claim 1, further comprising a first region limitation means for designating a first region in the digital image signal, wherein said contour extraction means is operable for extracting the contour of the lane from the first region.

4. A position detecting apparatus as claimed in claim 1, wherein said contour extraction means is operable for extracting a plurality of contours including the contour of the lane; and said feature detection means comprises:

matching means for producing matching lines by matching any of a straight line and an arc line with each of the contours extracted by said contour extraction means and for producing matching data indicative of the matching lines; and lane mark contour extraction means for selectively extracting two of the matching lines defining the lane wherein the two matching lines represent the dimensional features of the contour of the lane and for producing the dimensional data, wherein the dimensional data produced by said lane mark contour extraction means represents the two matching lines defining the lane.

5. A position detecting apparatus as claimed in claim 4, further comprising a first region limitation means for designating a first region in the digital image signal, wherein said contour extraction means is operable for extracting the contour of the lane from the first region.

6. A position detecting apparatus as claimed in claim 5, further comprising a second region limitation means for designating a second region in the first region only around the two matching lines represented by the dimensional data produced by said lane mark contour extraction means.

7. A position detecting apparatus as claimed in claim 4, further comprising a current position detection means for detecting a current position of the object based on the two matching lines defining the lane.

8. A position detecting apparatus as claimed in claim 7, further comprising yaw angle detection means for detecting a tilting angle of the lane with respect to the advancing direction based on the dimensional data and for producing a yaw angle signal indicative of the tilting angle of the lane with respect to the advancing direction.

9. A position detecting apparatus as claimed in claim 4, wherein said matching means is operable for applying a Hough transformation to the coordinate converted data produced by said conversion means so as to determine whether each of the contours extracted by said contour extraction means matches a straight line or an arc line.

10. A position detecting apparatus as claimed in claim 9, wherein said matching means is operable for determining that a particular contour line extracted by said contour extraction means matches a straight line when a plurality of lines formed by the Hough transformation of the coordinate converted data cross at a point with a frequency greater than a predetermined frequency, and for otherwise determining that the particular contour line matches an arc line.

11. A position detecting apparatus as claimed in claim 1, further comprising current position detection means for detecting a current position of the object with respect to the lane based on the dimensional data.

12. A position detecting apparatus as claimed in claim 11, further comprising curvature detection means for detecting a curvature of the lane with respect to the current position of the object based on the dimension data.

13. A position detecting apparatus as claimed in claim 1, further comprising:

current position detection means for detecting a current position of the object based on the digital image signal and for producing a current position signal indicative of the current position of the object;

curvature detection means for detecting a curvature of the lane based on the digital image signal and for producing a curvature signal indicative of the curvature of the lane; and a navigation apparatus for recording the curvature and the current position in map data stored in said navigation apparatus based on the current position signal and the curvature signal.

14. A position detecting apparatus as claimed in claim 13, further comprising:

moving speed detection means for detecting a moving speed of the object; and driving safety estimation means for judging whether the moving speed is too great to advance along a curved lane having the curvature detected by said curvature detection means based on the curvature detected by said curvature detection means and the current position detected by said current position detection means.

15. A position detecting apparatus as claimed in claim 14, further comprising image capture means for capturing an image of the perspective view from the object in the digital image signal such that said navigation apparatus is operable to record the image captured by said image capture means in the map data with respect to any of the curvature detected by said curvature detection means and the current position detected by said current position detection means.

16. A position detecting apparatus as claimed in claim 13, further comprising image capture means for capturing an image of the perspective view from the object in the digital image signal such that said navigation apparatus is operable to record the image captured by said image capture means in the map data with respect to any of the curvature detected by said curvature detection means and the current position detected by said current position detection means.

17. A position detecting apparatus for use with an object movable along a lane, said position detecting apparatus comprising:

an imaging device to be mounted on the object for capturing an image of a perspective view from the object in an advancing direction of the object along the lane and for generating a digital image signal representative of the perspective view including the lane;

a contour extraction means for extracting a contour of the lane from the digital image signal and for producing contour data indicative of the contour of the lane; and a feature detection means for detecting dimensional features of the contour of the lane extracted by said contour extraction means based on an inclination of the contour and for producing dimensional data indicative of the dimensional features of the contour of the lane.

18. A position detecting apparatus as claimed in claim 17, wherein the dimensional data produced by said feature detection means is indicative of a portion of the lane extending from the object in the advancing direction.

19. A position detecting apparatus as claimed in claim 17, further comprising a first region limitation means for designating a first region in the digital image signal, wherein said contour extraction means is operable for extracting the contour of the lane from the first region.

20. A position detecting apparatus as claimed in claim 17, wherein said contour extraction means is operable for extracting a plurality of contours including the contour of the lane; and said feature detection means comprises:

inclination matching means for obtaining an inclination between two neighboring pixels of each of the contours extracted by said contour extraction means, and for applying a Hough transformation to the inclinations so as to produce corresponding matching lines by matching a linear equation with each inclination;

quadratic polynomial matching means for applying a quadratic polynomial to each of the matching lines produced by said inclination matching means; and contour line extraction means for selectively extracting two of the matching lines defining the lane wherein the two matching lines represent the dimensional features of the contour of the lane and for producing the dimensional data, wherein the dimensional data produced by said contour extraction means represents the two matching lines defining the lane.

21. A position detecting apparatus as claimed in claim 20, further comprising a first region limitation means for designating a first region in the digital image signal, wherein said contour extraction means is operable for extracting the contour of the lane from the first region.

22. A position detecting apparatus as claimed in claim 21, further comprising a second region limitation means for designating a second region in the first region only around the two matching lines represented by the dimensional data produced by said contour extraction means.

23. A position detecting apparatus as claimed in claim 20, further comprising a current position detection means for detecting a current position of the object based on the two matching lines defining the lane.

24. A position detecting apparatus as claimed in claim 23, further comprising yaw angle detection means for detecting a tilting angle of the lane with respect to the advancing direction based on the dimensional data and for producing a yaw angle signal indicative of the tilting angle of the lane with respect to the advancing direction.

25. A position detecting apparatus as claimed in claim 17, further comprising current position detection means for detecting a current position of the object with respect to the lane based on the dimensional data.

26. A position detecting apparatus as claimed in claim 25, further comprising curvature detection means for detecting a curvature of the lane with respect to the current position of the object based on the dimension data.

* * * * *